July 25, 1950
H. E. HAEHNEL
2,516,514
KNITTING MACHINE PATTERN CONTROL MECHANISM
AND METHOD OF OPERATING THE MACHINE
Filed April 4, 1945
11 Sheets-Sheet 1
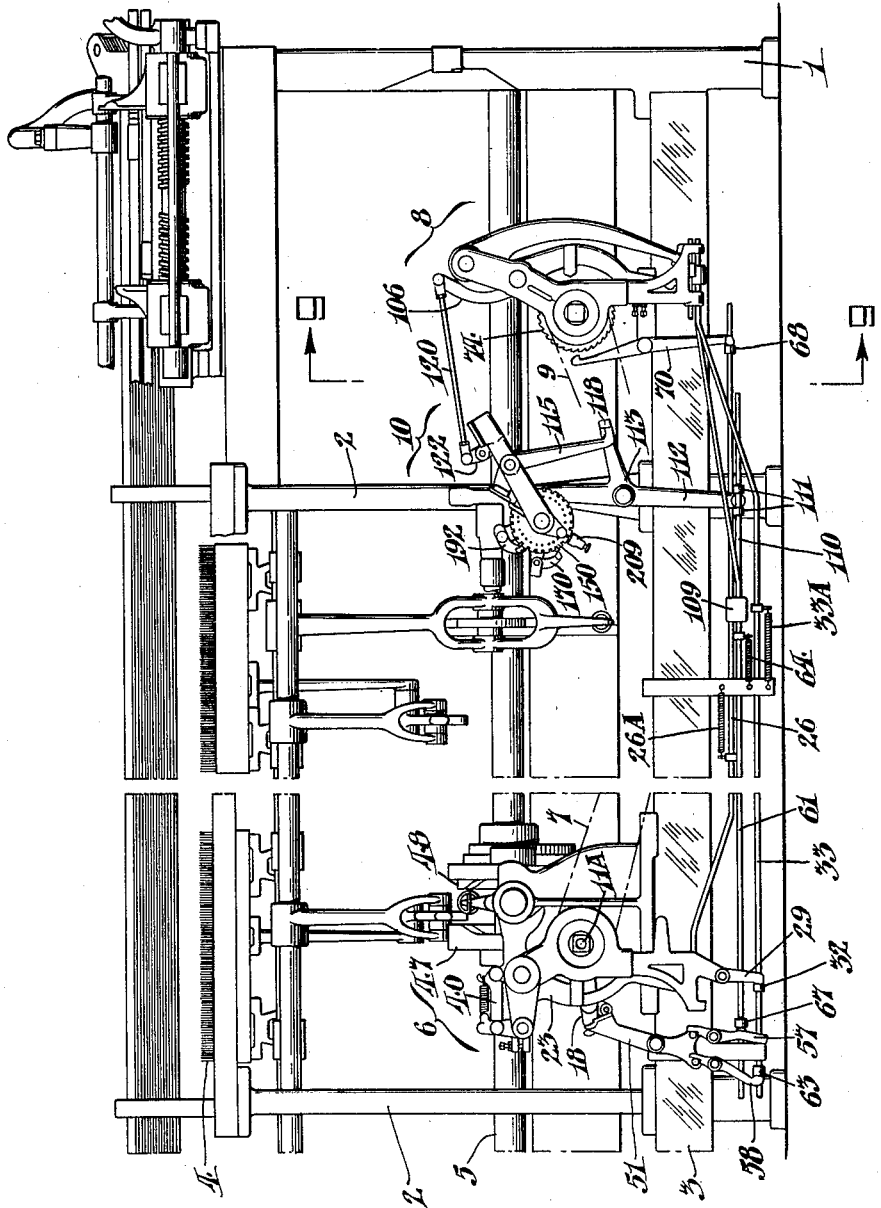
INVENTOR
Herbert Erich Haehnel
BY
ATTORNEY

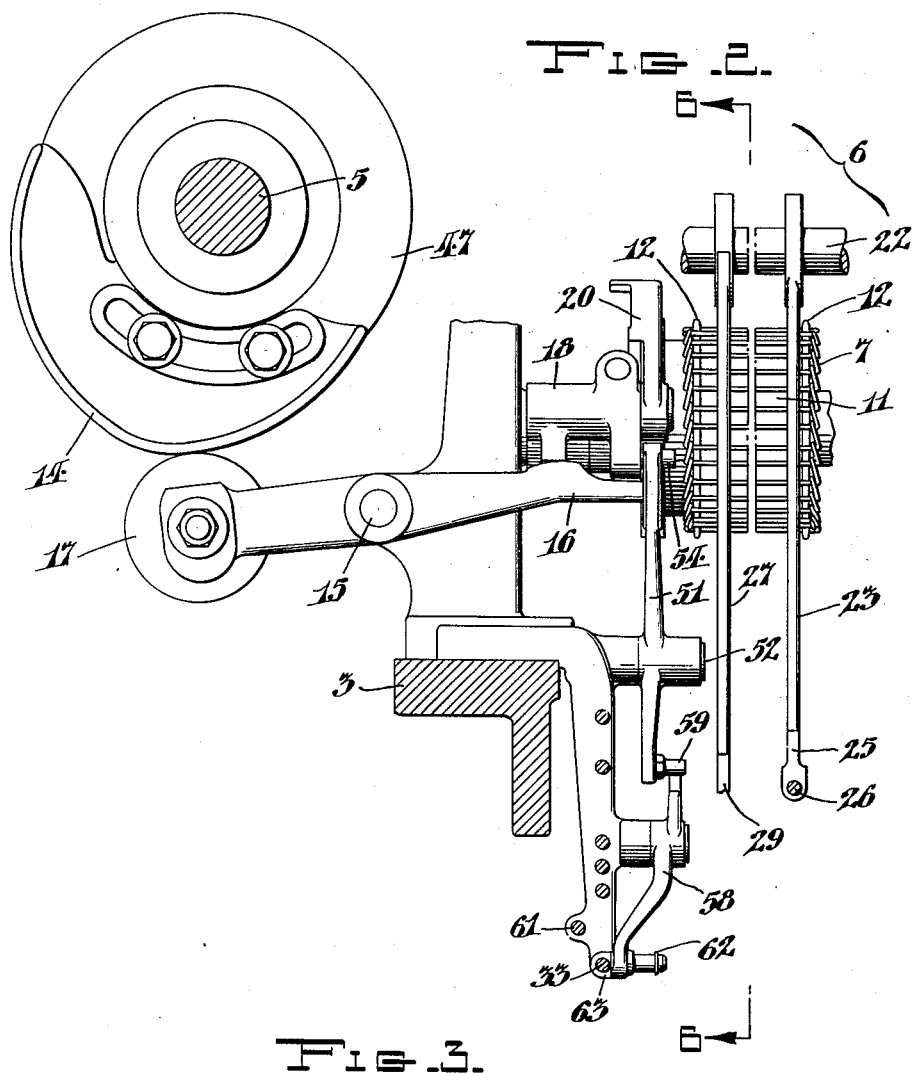
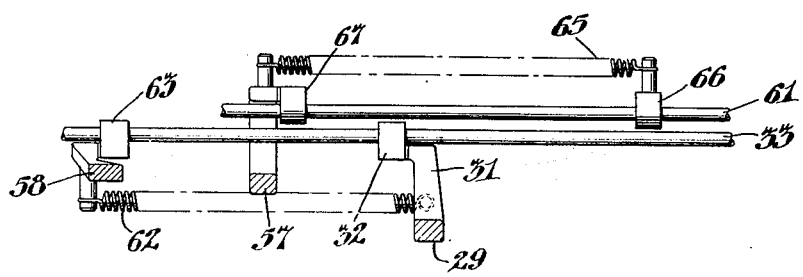

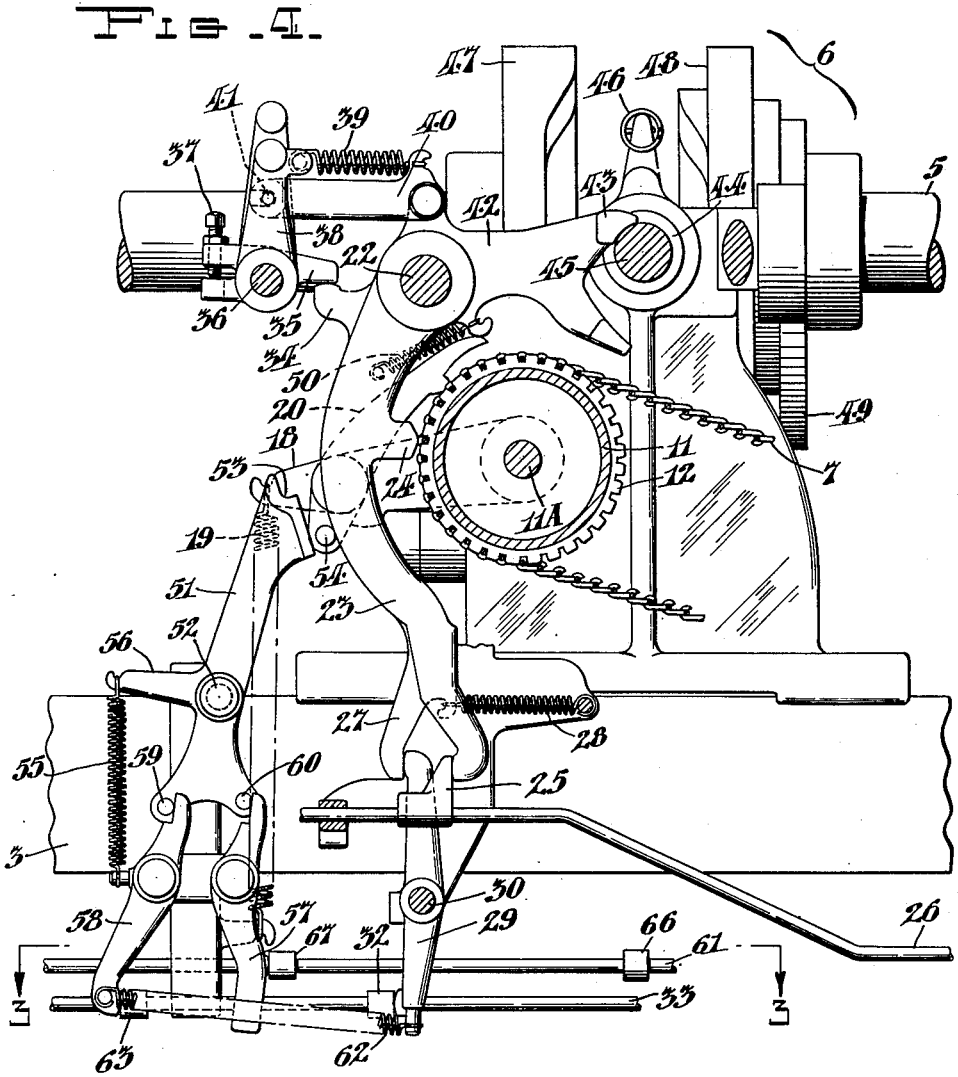
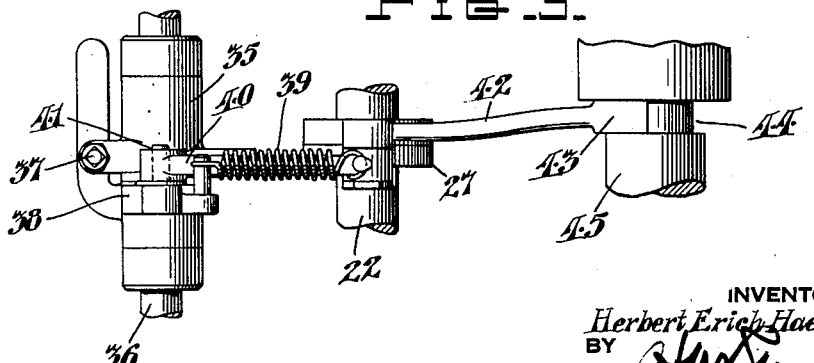

July 25, 1950
H. E. HAEHNEL
2,516,514
KNITTING MACHINE PATTERN CONTROL MECHANISM
AND METHOD OF OPERATING THE MACHINE
Filed April 4, 1945
11 Sheets-Sheet 4
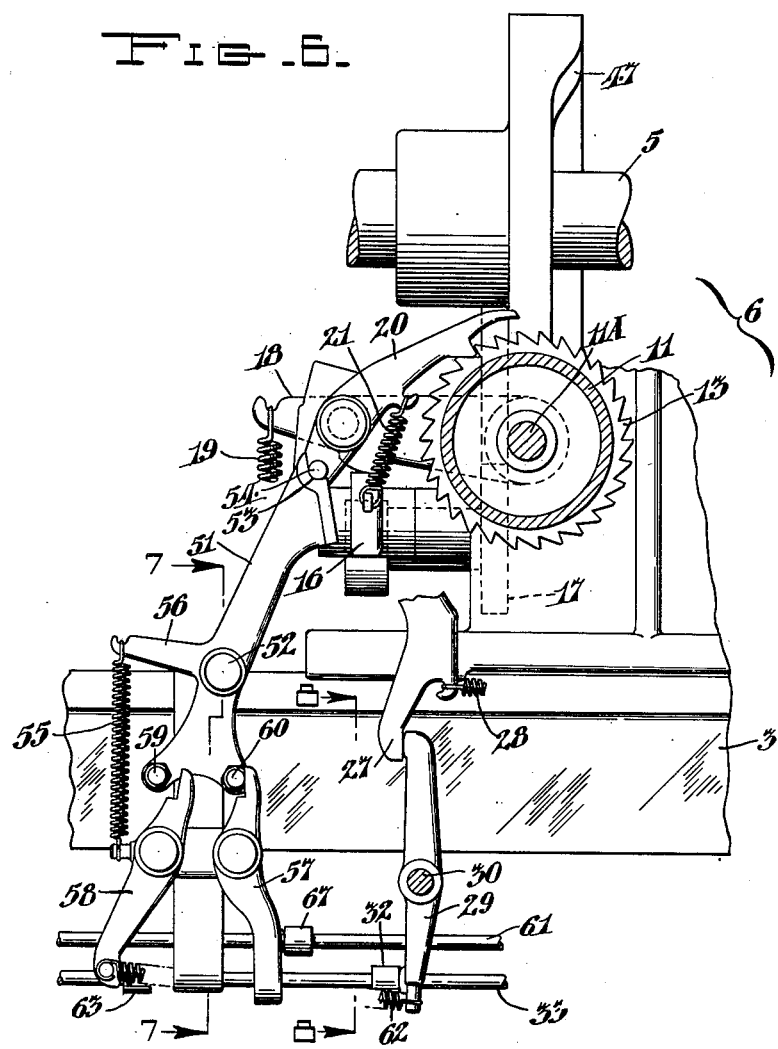
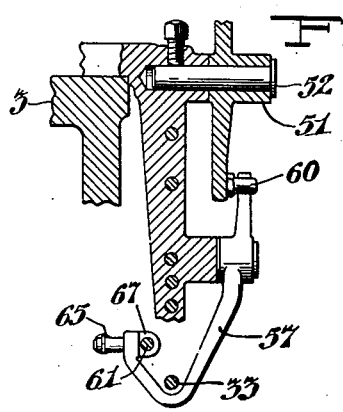
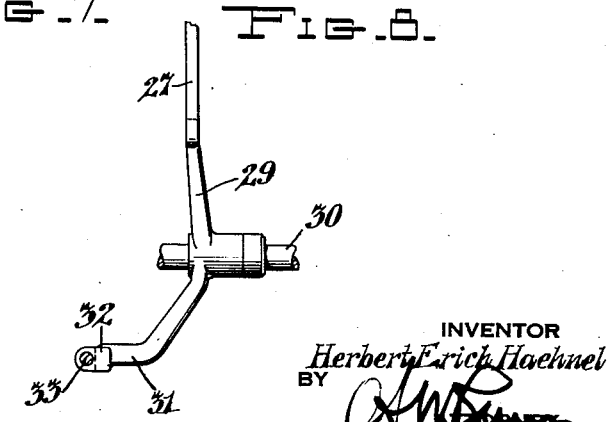
INVENTOR
Herbert Erich Haehnel
BY July 25, 1950     H. E. HAEHNEL     2,516,514
KNITTING MACHINE PATTERN CONTROL MECHANISM
AND METHOD OF OPERATING THE MACHINE
Filed April 4, 1945     11 Sheets-Sheet 5
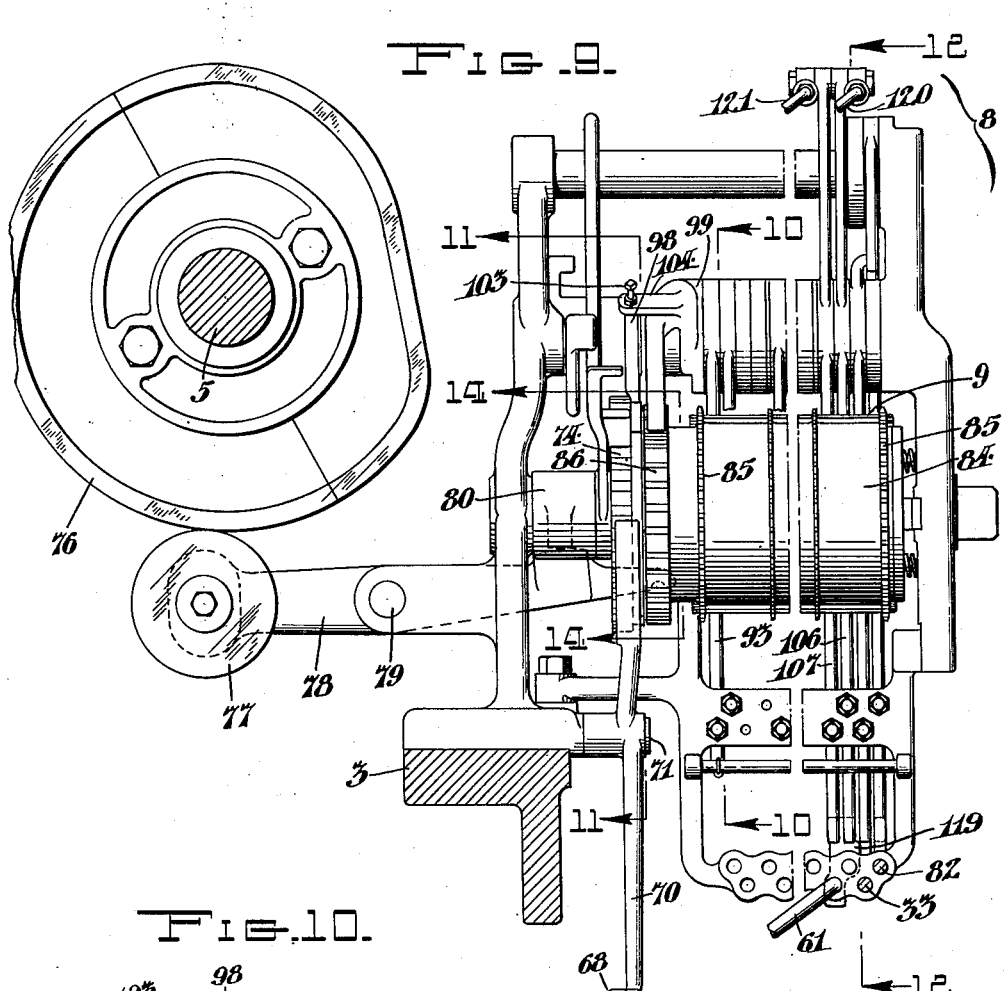
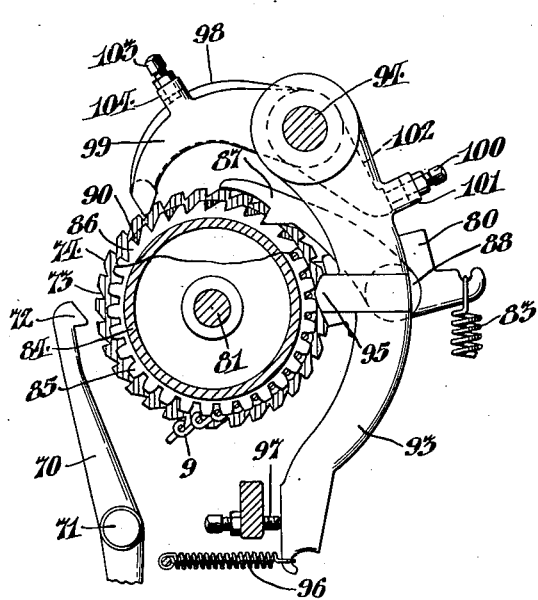
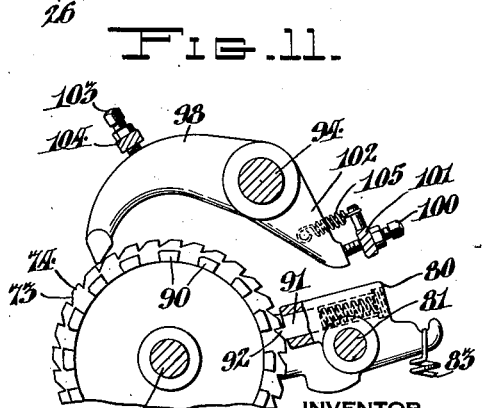
INVENTOR
Herbert Erich Haehnel
BY
ATTORNEY

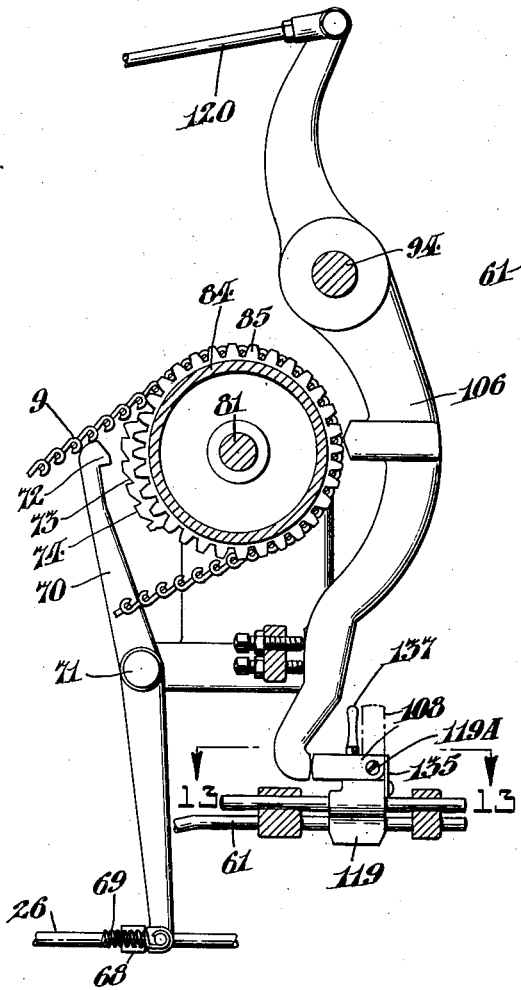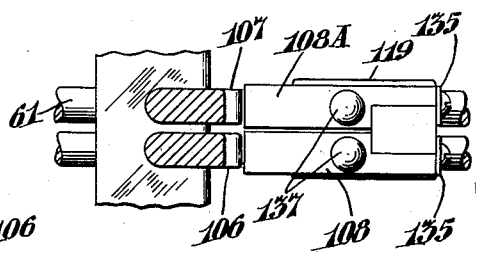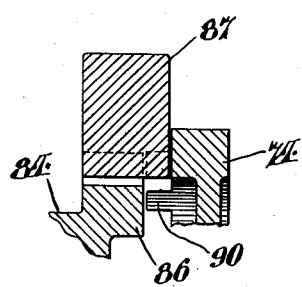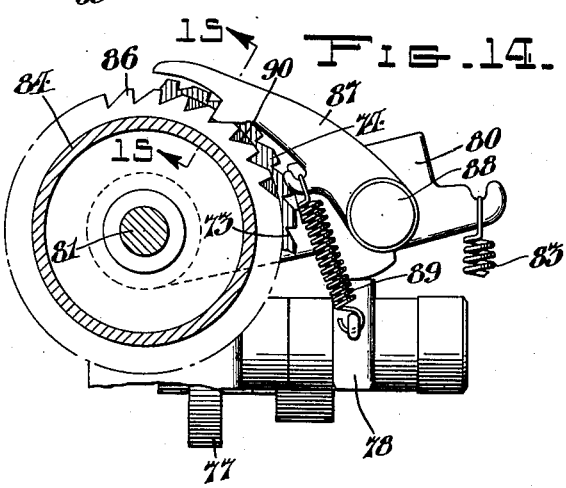

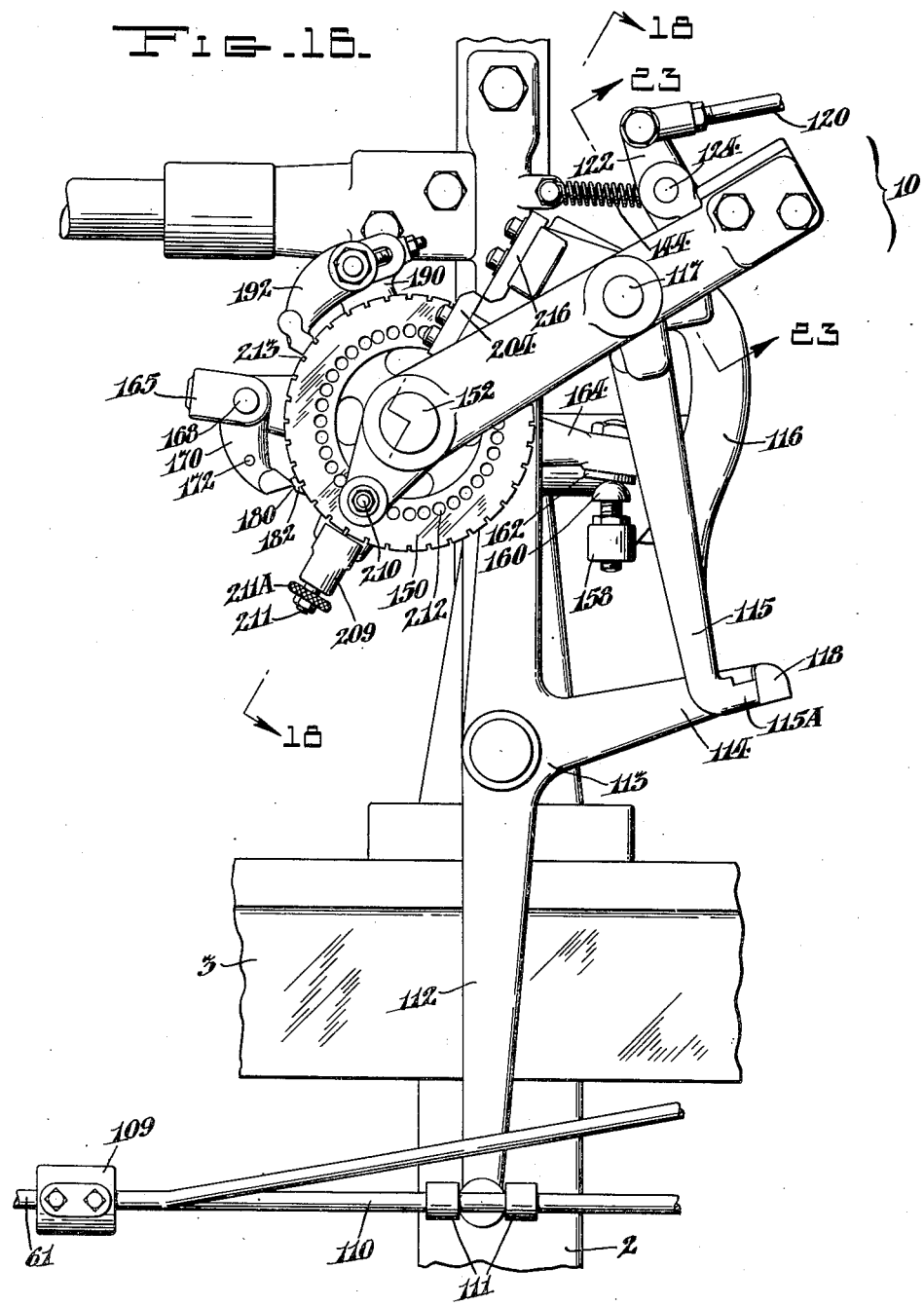

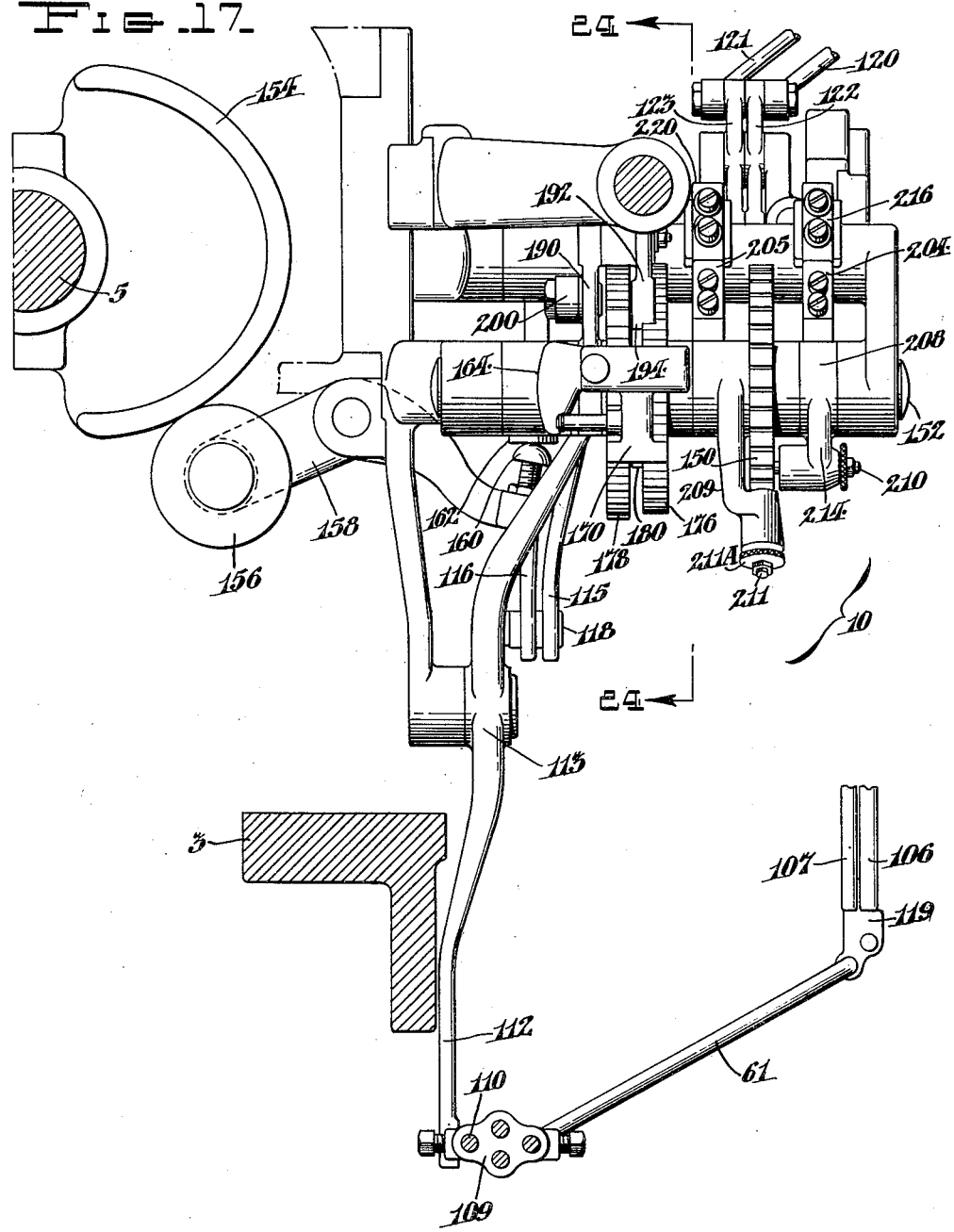

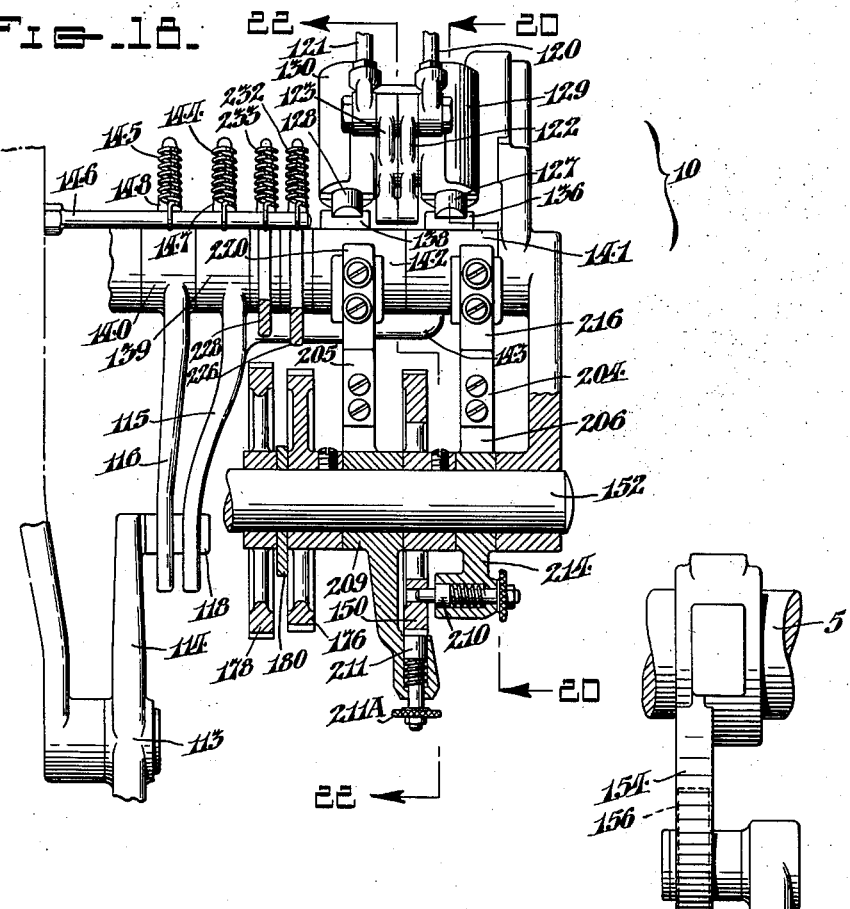

July 25, 1950  H. E. HAEHNEL  2,516,514
KNITTING MACHINE PATTERN CONTROL MECHANISM
AND METHOD OF OPERATING THE MACHINE
Filed April 4, 1945  11 Sheets-Sheet 10
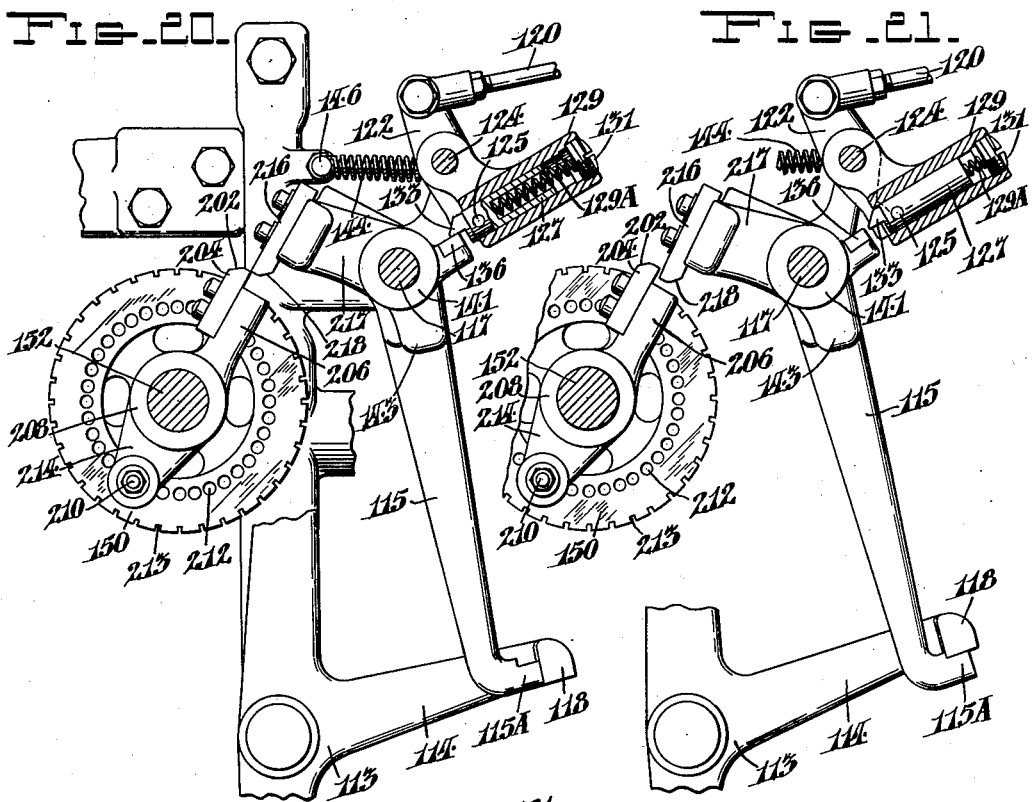
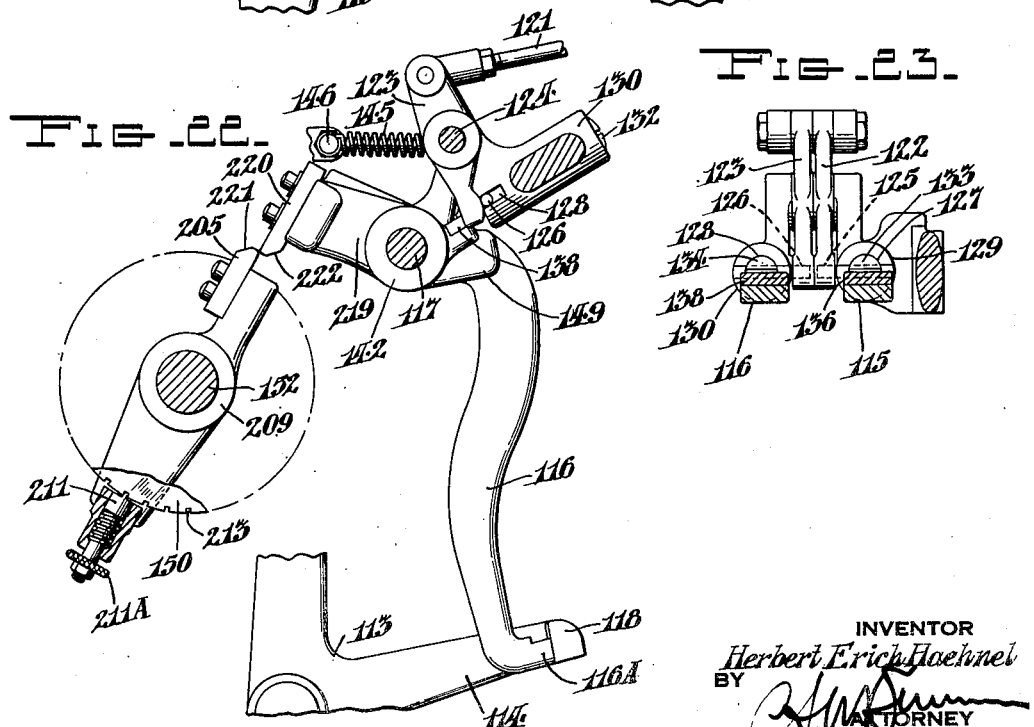
INVENTOR
Herbert Erich Haehnel
BY
ATTORNEY July 25, 1950 H. E. HAEHNEL 2,516,514
KNITTING MACHINE PATTERN CONTROL MECHANISM
AND METHOD OF OPERATING THE MACHINE
Filed April 4, 1945 11 Sheets-Sheet 11
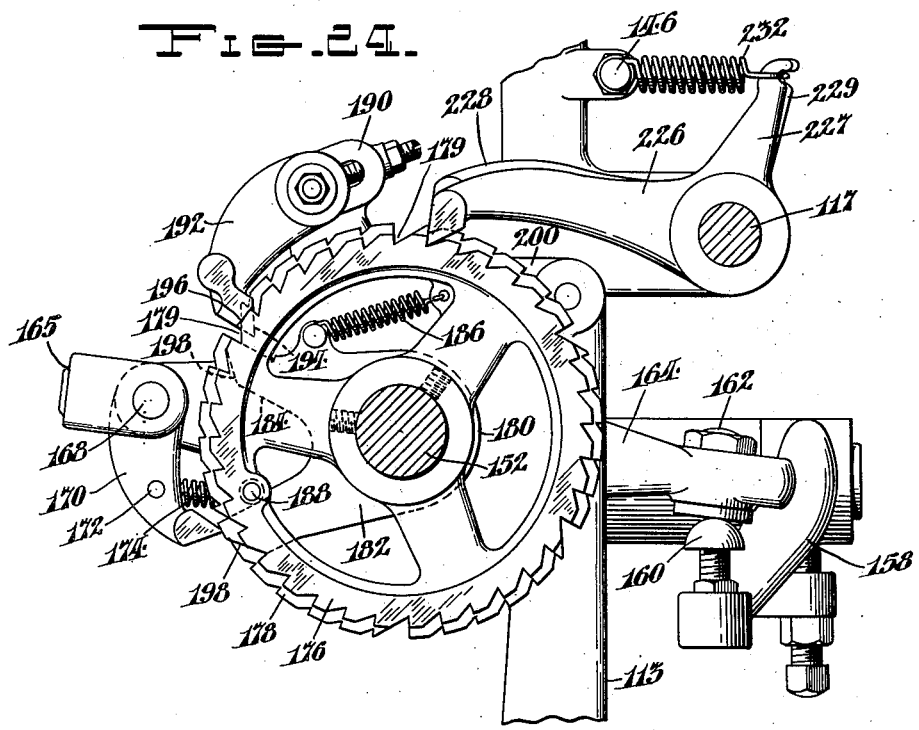
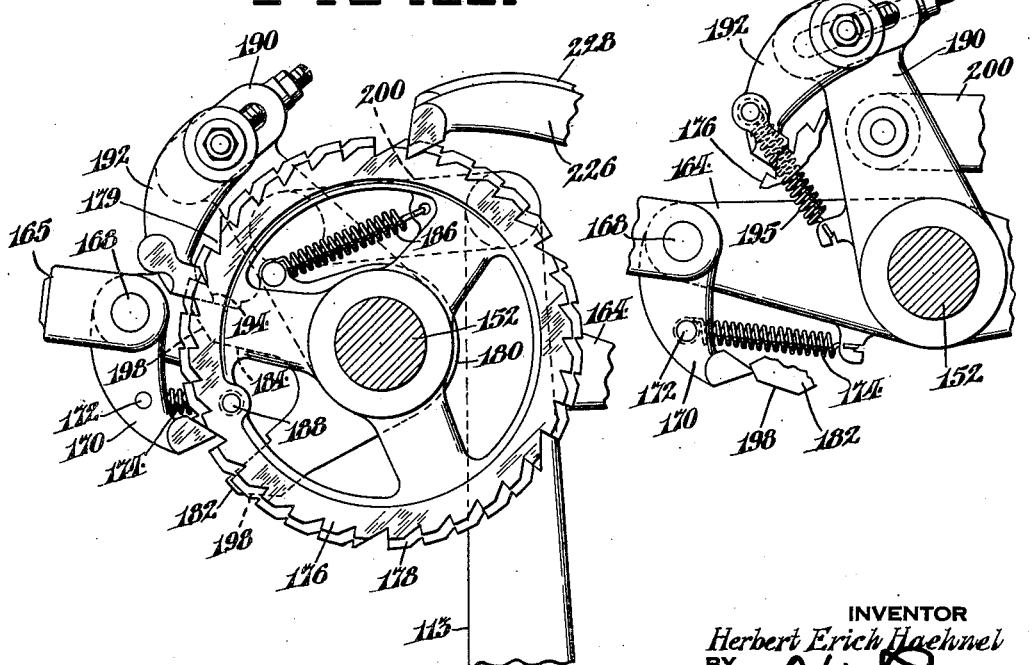
INVENTOR
Herbert Erich Haehnel
BY
ATTORNEY Patented July 25, 1950

2,516,514

UNITED STATES PATENT OFFICE 2,516,514

KNITTING MACHINE PATTERN CONTROL MECHANISM AND METHOD OF OPERATING THE MACHINE

Herbert Erich Haehnel, West Reading, Pa., assignor to Textile Machine Works, Wyomissing, Pa., a corporation of Pennsylvania Application April 4, 1945, Serial No. 586,526

29 Claims. (Cl. 66—155)

1

The present invention relates to pattern control mechanism for knitting machines, and more particularly to novel means for and a novel method of controlling the number of courses in fabrics made on full-fashioned knitting machines.

A mechanism is known for use in connection with the usual pattern chain of a full-fashioned knitting machine to permit varying the number of courses from one fabric knitted on the machine to the next without changing the number of links in the pattern chain. Said mechanism is known as a "course-counter" and has been employed heretofore to vary the number of courses in the stocking fabric by stopping the pattern chain at a certain point and then starting it again after a certain predetermined number of courses have been knitted, such number being variable between limits set by the "course-counter" mechanism. Within said limits the operator can vary the number of courses so added or inserted by merely changing the setting of the course-counter. The operator is able to do this at any time between the end of one insertion and the time the pattern chain is set to again cause an operation of the course-counter. A mechanism operating on this principle is disclosed in the patent to Pingel, No. 2,214,936, September 17, 1940.

It is an object of the present invention to improve on the mechanism of said patent whereby to add to full-fashioned knitting machines an increased efficiency and range of operation.

Another object of the invention is to provide a course-counter mechanism adapted to act at a plurality of points in the length of a pattern chain to permit introduction of knitted courses at one or more points in a stocking or other fabric as desired. By such improved mechanism, a full-fashioned knitting machine is rendered capable of producing variations, at will, in the size (length) of either or both the leg and foot portions of stockings knitted thereby.

Another object is to provide a course-counter mechanism adapted for use in connection with a full-fashioned knitting machine of the type used to knit entire stockings.

Another object of the invention is to provide a course-counter mechanism which is adapted to insert predetermined numbers of courses at different points in a stocking or other knitted fabric and to repeat such insertions automatically in as many subsequent fabrics as desired without attention on the part of the operator but which can be reset or thrown out of action at any time as desired.

With these and other objects in view, which will

2 become apparent from the following detailed description of the illustrative embodiment of the invention shown in the accompanying drawings, the invention resides in the novel elements, features of construction, arrangement of parts in cooperative relationship and method of operation, as hereinafter more particularly pointed out in the claims.

In the drawings:

Figure 1 is a front elevational view of portions of a full-fashioned knitting machine equipped with apparatus illustrative of the invention;

Fig. 2 is an end view taken from the left of Fig. 1, showing the main pattern means of the machine, parts being omitted and others shown in section;

Fig. 3 is a sectional detail view taken substantially on the line 3—3 of Fig. 4;

Fig. 4 is a front elevation on an enlarged scale of a portion of Fig. 1, parts being broken away and shown in section;

Fig. 5 is a detail plan view of certain of the parts shown at the upper left of Fig. 4;

Fig. 6 is a sectional elevation somewhat similar to Fig. 4 taken substantially along the line 6—6 of Fig. 2, looking in the direction of the arrows;

Fig. 7 is a sectional view taken substantially on the line 7—7 of Fig. 6, looking in the direction of the arrows;

Fig. 8 is a detail sectional view on the line 8—8 of Fig. 6, looking in the direction of the arrows;

Fig. 9 is a sectional view taken on the line 9—9 of Fig. 1, looking in the direction of the arrows and showing additional pattern means of the machine with certain of the parts broken away;

Fig. 10 is a detail sectional view taken substantially on the line 10—10 of Fig. 9, looking in the direction of the arrows;

Fig. 11 is a detail sectional view taken substantially on the line 11—11 of Fig. 9, looking in the direction of the arrows;

Fig. 12 is a sectional view taken substantially along the line 12—12 of Fig. 9;

Fig. 13 is a detail sectional view taken substantially on the line 13—13 of Fig. 12;

Fig. 14 is a detail view taken substantially on the line 14—14 of Fig. 9;

Fig. 15 is a detail sectional view taken on the line 15—15 of Fig. 14, looking in the direction of the arrows;

Fig. 16 is an elevational view of the course-counting mechanism of the invention as shown in Fig. 1, and shown on an enlarged scale relative thereto;

Fig. 17 is a view of the mechanism of Fig. 16 as seen from the left of said figure;

Fig. 18 is a sectional view taken substantially on the line 18—18 of Fig. 16, looking in the direction of the arrows;

Fig. 19 is a skeletonized view of means for racking parts shown in Figs. 16, 17, 18, parts being shown in plan and parts being shown in section;

Fig. 20 is a sectional view taken substantially along the line 20—20 of Fig. 18, looking in the direction of the arrows, certain parts being omitted;

Fig. 21 is a detail view similar to Fig. 20 but showing the parts in different relative positions;

Fig. 22 is a sectional view taken substantially along the line 22—22 of Fig. 18;

Fig. 23 is a detail section taken on the line 23—23 of Fig. 16, looking in the direction of the arrows;

Fig. 24 is a detail sectional view on the line 24—24 of Fig. 17 looking in the direction of the arrows;

Fig. 25 is a view similar to Fig. 24, parts being omitted and parts being shown in different relative positions; and Fig. 26 is a fragmentary detail view of a portion of Fig. 24, parts being omitted and parts being broken away for the purposes of illustration.

A mechanism according to the present invention comprises, in a knitting machine having a pattern control means, a course-counting or course-inserting means adapted, when the pattern control means has been stopped and when it is itself put into operation, to count a number of courses predetermined by the setting of the course-counting means and not provided for by the pattern control means and then to start the pattern control means again. In other words, the course-counting device is supplemental to and operates conjunctively with the main pattern control mechanism in such manner as to materially increase the capacity of such main mechanism without relatively adding to its operating elements. In fact the present novel device may in the knitting of hosiery and the like be combined with the usual pattern chain to take the place of a great number of the chain links, thus, simplifying the construction of this rather complicated mechanism. Further, in the preferred form of the invention shown, the counting means comprises a plurality of means, each adapted to operate independently of the other but in a given order, whereby a number of courses varying from zero upward may be inserted into the fabric as desired within the limits of the counting means. When once the pattern control means has been set to start the independently operable counting means at the times desired and the counting means have been also set, the counting means will repeat its action in each cycle of the pattern control means to insert predetermined numbers of courses at different points in as many successive fabrics as desired. The course-counting means may be reset at any time to change the number of courses to be inserted into the fabric at any point because of its action. Preferably, as is herein illustrated, the pattern control means is in two parts and divided into a main pattern means and an auxiliary pattern means. This arrangement is usual in modern full-fashioned machines and considerably simplifies the pattern control means, the same being however, incidental only to this invention which is not limited to a divided pattern control means in all cases. A late type of knitting machine equipped with mechanism within the invention is herein shown and described.

In the drawings and description, only the means and method necessary to a complete understanding of the invention have been specifically set forth; further information as to the construction and operation of other related, usual and well known knitting machine elements, mechanisms, etc., may be found in one or more of the following publications:

1. Pamphlet entitled—Full-Fashioned Knitting Machines—published and copyrighted by the Textile Machine Works, Reading, Pennsylvania, in 1920.

2. Three catalogs entitled—The "Reading" Full-Fashioned Knitting Machine Parts Catalog—published and copyrighted by the Textile Machine Works, in 1929, 1935 and 1940, respectively.

3. Booklet entitled—the "Reading" High-Production Full-Fashioned Knitting Machine—which forms a supplement to the above noted 1940 parts catalog of the Textile Machine Works, and which booklet is a publication of the Textile Machine Works, and was copyrighted by the latter in 1940.

4. Pamphlet entitled—Knitting Machine Lectures—published by the Wyomissing Polytechnic Institute, Wyomissing, Pennsylvania, in 1935.

A mechanism within the invention is shown in the drawings in association with a full-fashioned knitting machine, although the invention is adapted to be used with knitting machines of other types employing pattern control devices. The said illustrated knitting machine (Fig. 1) has a frame-work comprising spaced transverse end and center frames 1 and 2, respectively, connected by longitudinal members of which the front beam 3 may be particularly mentioned. On said framework, the knitting needles 4 and associated elements for forming and interlooping the yarn stitches are mounted, together with actuating means and controlling means therefor including patterning means. The principal actuating means for the machine are cams mounted on a main cam shaft 5 while the controlling means are commonly for the most part embodied in the patterning means shown as of the chain type. As shown, the pattern control means is divided into two parts, a main means 6 including a chain 7 with actuating means therefor and an auxiliary means 8 including a chain 9 and actuating means therefor.

The chains 7 and 9 are arranged to control various functions of the machine and for this purpose are composed of a variable number of articulated links. The links of chains 7 and 9 are separable so that the length of a chain can be increased by inserting or decreased by withdrawing links and are wide enough to afford aisles for arms of a considerable number of pivoted levers arranged side-by-side and so as to be contacted and operated by buttons attachable to any of the links in any of the aisles to turn the levers on their pivots to thereby move control rods individual to said levers in the direction of the lengths of the rods. The control rods cause various functions to be performed at desired times, usually by moving a cam follower into position to cooperate with a cam on the main camshaft. Illustrative of functions controlled by rods operated by buttons on chains 7 and 9 are the shogging of the main camshaft for carrying out widening or narrowing cycles, racking of the spindles on which are the nuts for moving the end stops and the narrowing combs, prevention of knitting during certain so-called idle courses, the production of loose courses and alterations of the lengths of loops when loops of less length than loose course loops are desired. In the construction of the knitting machine the chains 7 and 9 are made of a width capable of coacting with a plurality of levers for operating a number of control rods. The control of the different functions is then allocated to the different chains as may be convenient. For instance, often the narrowing operations in the leg and part of those in the foot, except those in which the course-counter operates, are controlled by chain 7 and the remainder by chain 9. As is customary, both the main and auxiliary chains 7 and 9, are racked or actuated by means associated with the camshaft, whereby each revolution or each of certain selected revolutions of the camshaft produces a movement of such chains equivalent to their link components. Of course, as will appear hereinafter, each chain is operated independently of the other and other mechanisms are provided by means of which the operation of either or both chains may be suspended for any predetermined period, as when a course counting mechanism is functioning.

During the periods in the operation of the machine in which the chain 7 and the chain 9 are both stationary, the knitting elements continue to make courses one for each revolution of shaft 5, all the same as to number of stitches, yarn and length of loops, although the arrangement herein disclosed provides means whereby the number of stitches per course may be changed while the chain 7 is stationary provided chain 9 is in operation. By increasing or decreasing the length of chain 7 by changing the number of links therein, the minimum number of courses in a fabric to be knitted is increased or decreased, while increasing or decreasing the length of chain 9 by increasing or decreasing the number of links therein increases or decreases the number of individual operations which can be controlled thereby. In the more usual practise, when a machine has knitted all of a certain type of fabric, such as a stocking blank, required and it is then desired to knit a number of blanks of an increased length, it is necessary that the machine be stopped long enough to permit a mechanic to insert the necessary numbers of links in chain 7 and perhaps also in chain 9. If courses are to be added in more than one part of a blank, as in both the leg and the foot of a single unit blank, links must be inserted in the appropriate parts of the chain or chains with a corresponding increase in the length of time the machine must remain idle.

On the contrary, when a course-counter 10 as shown, one within my invention, is employed, it is not necessary to do more than to move an indexing lever to cause the machine to lengthen the blanks to be made by inserting courses at a desired point when once a button has been placed on the chain 7 to throw the course-counting means into operation. The placing of such a button can be attended to at the time of adjusting the links and buttons of the chain for knitting the shorter fabric. By placing the indexing handle on the zero point, the course counting means will be caused to throw itself out of action almost immediately after the button on chain 7 has thrown it into action, so that the effect on the shorter fabric is immaterial. When the longer fabric is to be made, all that is then necessary is to move the indexing lever away from the zero mark to cause additional courses to be inserted in the fabric. In the arrangement shown, two indexing levers are provided and buttons are provided on both chain 7 and chain 9 whereby the two indexing levers, when not in their zero positions, are caused to control the insertion of courses at different desired points. Usually, in making single unit stocking blanks, course-counter 10 will be used to insert courses in the leg and in the foot when it is desired to lengthen the blanks.

The main cycle of operations performed by the mechanisms employed within the present invention is as follows: a button on the main chain 7 operates a rod whereby the auxiliary chain 9 is thrown into operation. Auxiliary chain 9 then stops the main chain 7, starts the course-counting mechanism 10, and stops itself after a proper interval. The course-counter mechanism 10 in turn starts the main chain after a proper but variable interval and thereafter stops itself. As shown herein, the shogging of the main camshaft 5, an operation performed at times of narrowing and widening the fabric, also is controlled by the auxiliary chain 9 as to shogging operations needed when the main chain 7 is stationary. As no course is formed at times of widening or narrowing, it is desired that the racking of chain 7 be prevented at such times and an arrangement is therefore provided whereby the chain 9 positively prevents a racking action of the means for racking chain 7 when a narrowing or widening cycle is to be performed during the period course-counter mechanism 10 is to operate. The interconnecting elements whereby said chain and course-counter mechanisms react one on the other to produce the said desired cycle, as well as the chain mechanisms and the course-counter mechanism, will now be described in detail.

As is usually the case, the main pattern chain 7 is mounted on a drum 11 on a shaft 11A at right angles to shaft 5. As is clear from Figs. 1 and 2, the shaft 11A is mounted in brackets fixed to the frame of the machine in the ordinary way so that the shaft is fixed against movement other than an angular one. Fixed on the drum on shaft 11A are also sprockets 12, as indicated in Fig. 2, meshing with chain 7 and a ratchet wheel 13, shown in Fig. 6, actuated by impulses received from cam shaft 5. For actuating wheel 13 and thereby chain 7, a cam 14 is provided on shaft 5 and arranged to turn a lever 16 in one direction about its pivot 15, lever 16 having pivoted thereon at its rear end a cam follower 17, preferably of the roller type as shown. At the end opposite follower 17, lever 16 has operating contact with the underside of a lever 18 one end of which is journalled on shaft 11A and the other end of which is drawn downwardly by a spring 19. A pawl 20, best shown in Figs. 4 and 6, is pivotally mounted on lever 18 and positioned to rack wheel 13 when lever 18 is oscillated about shaft 11A. A spring 21 connects pawl 20 and lever 16 to hold the pawl against wheel 13 and lever 16 against lever 18. Spring 19 is energized by cam 14 and maintains the lever 16 in position to hold its follower 17 against the face of cam 14 and to thereby move the lever in the direction opposite to that in which it is moved by the cam, racking movement of the lever 16 being caused by the cam 14 by depressing follower 17 and thereby raising the end of lever 16 in contact with lever 18. It will be seen that racking of chain 7 may be stopped by holding levers 16 and 18 in the positions into which they are moved by the high spot or maximum radius of the cam 14 taken from the center of shaft 5 and this feature is employed in a way which appears hereinafter.

Ordinarily, chain 7 has a number of levers and co-operating control rods associated therewith for controlling different functions and/or operations of the machine, said levers pivoted at their upper ends on a shaft 22, best shown in Fig. 4. However, only three rods and only two levers are directly involved in carrying out the present invention. Therefore, while a number of rods are indicated in Fig. 7, only two levers 23 and 27 are shown in the drawing on shaft 22. Of these, lever 23 is operated by chain 7 only, while lever 27 may be operated by auxiliary chain 9 as well as by chain 7 and lever 23 initiates racking of the auxiliary chain 9 while lever 27 initiates shogging movements of camshaft 5. The buttons for operating such levers from pattern chains 7 and 9 are fixed to appropriate links on the chain. When a projection 24 on lever 23 is contacted by a button on chain 7, the lever moves clockwise on pivot 22 and its lower end thereupon moves a dog 25 to the left as viewed in Fig. 4. Dog 25 is fixed to a rod 26 and the rod therefore also moves to the left with the dog, rod 26 and the dog thereon being biased to the right by a spring 26A, Fig. 1. Rod 26 is used to throw into operation the means for racking auxiliary pattern chain 9 by means which will presently appear.

The lever 27, the second one shown on shaft or pivot 22, being used to cause a shogging of shaft 5 for narrowing and like purposes, has a tension spring 28 thereon connecting it near its lower end to a fixed point and biasing the lever in the counterclockwise direction about its pivot 22 as viewed in Fig. 4. The extreme lower end of lever 27 is held by spring 28 in contact with the upper end of a lever 29 which is pivoted at 30 on a fixed pivot near its middle, spring 28 therefore acting also to bias lever 29 in the clockwise direction about its pivot. Near its lower end lever 29 projects laterally as best shown at 31 in Fig. 8 so as to contact with a collar 32 on a rod 33 which is operated from chain 9, the chain 9 acting to draw rod 33 to the right at times from the position shown in Fig. 4 to cause shogging of shaft 5 by turning lever 29 counterclockwise and thereby turning lever 27 clockwise, but the rod, when released by chain 9, being drawn to the left as viewed in Fig. 4 by a spring 33A (Fig. 1), assisted in some measure by spring 28. The button on chain 9 is set to release rod 33 as soon as the revolution of shaft 5 for a fashioning operation has been completed, so that there shall be no chance that chain 9 will hold the camshaft in its fashioning position when a course should be formed and knitted. The motion of lever 27 is the same whether operated by a button on chain 7 or by the rod 33 from chain 9. Certain advantages accrue from controlling certain of the shogging movements of shaft 5 from the chain 9 as will hereinafter more fully appear.

The means shown whereby lever 27, when turned clockwise about its pivot, controls the shogging of shaft 5 comprises an off-set arm 34 near the upper end of lever 27 which contacts the under surface of a horizontal arm forming part of a lever 35 pivoted on a rod or shaft 36 parallel to shaft 22. On the other side of its pivot from its point of contact with arm 34, lever 35 has an adjustable bolt 37 fixed in another horizontal arm thereof for contacting the upper face of a horizontal arm of a bell-crank lever 38, pivoted alongside lever 35 on shaft 36, whereby lever 35 transmits a thrust to lever 38 for turning it in the counterclockwise direction as viewed in Fig. 4. Lever 38 has a vertical arm the upper end of which is connected by a spring 39 to a lug at the right end, as viewed in Fig. 4, of a rod or link 40 which is supported at its left end by a pin and slot connection 41 with the vertical arm of lever 38 while the right end of rod 40 has a pivoted connection with a lug on a generally horizontal lever 42. Lever 42 is pivoted at its left end on shaft 22 and is bifurcated at its right end, as viewed in Fig. 4. The upper prong 43 of the bifurcated end of lever 42 normally rests in a groove 44 in a shaft 45 to normally hold said shaft forward in the position, shown in Figs. 4 and 5, against the pull of a tension spring 46. Shaft 45 has a roller type cam follower thereon (not shown) which contacts for part of each revolution with a side cam 47 on shaft 5 so long as the shaft 45 remains in the position shown and in which prong 43 normally maintains it, thereby holding shaft 5 in its left position. When, however, lever 27 has been swung clockwise by a button on chain 7 or by rod 33 from the chain mechanism 9, lever 35 is turned counterclockwise, thereby also turning levers 38 and 42 counterclockwise by the connections hereinabove mentioned, shaft 45 is thereby released from prong 43 and spring 46 thereupon moves shaft 45 rearwardly so that the roller type follower thereon is in position to contact a cam 48 for shifting shaft 5 to the right. At the proper point in the revolution, the cam follower on shaft 45 then comes into contact with cam 48 on shaft 5 to force the shaft the desired distance to the right, as viewed in Fig. 4. After a proper interval, the chain 9 releases rod 33 and it moves back toward the left to the position shown in Fig. 4 under the influence of springs 28 and 33A or else chain 7 releases lever 27. In either case, spring 28 moves lever 27 counterclockwise to release the tension on spring 39 and a tension spring 50 connected between levers 27 and 42 thereupon draws lever 42 so that prong 43 moves down against shaft 45. At about this time, a radial camming projection 49 on cam member 48 moves shaft 45 forward again so that the spring 50 can draw prong 43 down again into groove 44 to latch shaft 45 in its forward position until another operation of lever 27 by rod 33 or chain 7. It will be noted moreover that rod 40 acts as a spacer to prevent the spring 39, which is relatively stronger than spring 50, from moving lever 42 counterclockwise except when a clockwise movement of lever 27 places spring 39 under a special tension.

For preventing racking of chain 7 at such times as chain 9 causes a course-inserting or a cam shaft shogging operation, a lever 51 is provided mounted to turn on a pivot 52. Lever 51 has a notch 53 at its upper end adapted to receive a pin 54 which projects laterally from the pawl 20, Fig. 2, and lever 51 is so proportioned that its upper end can swing clockwise to move beneath pin 54 when the lever 18 has been lifted to the top of its path by cam actuated lever 16. Normally, however, lever 51 is biased in the counterclockwise direction as viewed in Fig. 4 by a spring 55 which is connected between the free end of an arm 56 on lever 51 and a fixed point. Therefore, the upper end of lever 51 normally stands free of pin 54 in the position, shown in Fig. 4, the lever 18 and pawl 20 being then free to oscillate to rack chain 7. Evidently, if lever 51 is turned in the clockwise direction from the position shown in Fig. 4 to that shown in Fig. 6 so that the sides of notch 53 engage the pin 54, the racking of chain 7 will be prevented so long as lever 51 remains in such position. Two levers 57 and 58 are provided in the arrangement shown for turning lever 51 in the clockwise direction. Both of levers 57 and 58 are pivoted near their mid-points and are adapted to contact at their upper ends with pins 59 and 60 set at the corners of the broad lower end of lever 51. When levers 57 and 58 are turned counterclockwise about their pivots, lever 51 will be turned clockwise to engage pin 54 to stop chain 7. For so turning lever 58, the previously mentioned rod 33 is employed, while a rod 61 is employed to turn lever 57. Rod 61 is biased to the left by a spring 64, Fig. 1, and is operated by the auxiliary pattern chain 9 as in the case of rod 33. As rod 61 is moved by the auxiliary chain 9 at the time it throws the course-counting or course-inserting mechanism 10 into action, it will be seen that dividing the patterning means into two parts and placing some of the narrowing and course-inserting functions under the control of the auxiliary pattern means or chain permits a narrowing or a widening operation to be carried out while the main pattern means or chain is held stationary to permit the insertion of extra courses.

When rod 33 is moved to the right by chain 9, a spring 62 is tensioned, said spring being connected between pins at the lower ends of levers 29 and 58 so that tension in the spring urges lever 58 in the counterclockwise direction and therefore causes it to press against said pin 59 to urge lever 51 in the clockwise direction. Therefore, as soon as pin 54 has been moved up to the level of socket or notch 53, lever 51 slips beneath pin 54 and prevents the racking action of pawl 20 so long as pin 54 is in notch 53 by holding pawl 20 and lever 16 slightly below the point to which they are moved by the high point of cam 14. Movement of the rod 33 to the right also causes levers 29 and 27 to operate to effect a narrowing operation of the machine as hereinbefore set forth. As soon as the desired narrowing or widening operation has been accomplished, rod 33 is released by chain 9 and moves to the left again under the influence of springs 28 and 33A. Lever 58 is then moved clockwise by contact of a collar 63 on rod 33 with the lower end of the lever, thereby permitting spring 55 to draw lever 51 out from under pin 54 to permit racking of chain 7 to be resumed, and the springs 62 and 28 return the levers 29 and 27, respectively, to the position shown in Fig. 4.

Similarly, when chain 9 operates rod 61, the rod is moved to the right as viewed in Figs. 4 and 6 and the lever 57 is turned. A spring 65 shown in Figs. 3 and 7 is connected between a collar 66 on rod 61 and a pin on the lower end of lever 57 to hold lever 57 against a collar 67 on the rod 61 to thereby transmit a pull from the rod 61 to the lever tending to turn it counterclockwise and to turn lever 51 clockwise. As soon as pin 54 reaches the high point in its path, the tension of spring 65 causes lever 51 to turn clockwise, due to the pressure of lever 57 against pin 60 and to thereby bring notch 53 into supporting contact with pin 54 to interrupt the racking of chain 7. In this case, however, rod 61 may be retained in its right hand position for quite a few courses, thereby maintaining chain 7 stationary for a corresponding length of time.

When chain 7 is held stationary due to the action of rod 33, the racking means for chain 7 may be released to act if desired at the end of only one revolution. Ordinarily, of course, rods 33 and 61 are operated at different times, so that an operation of rod 61 causes pin 59 to move away from the upper end of lever 58 as shown in Fig. 6. In case then that rod 33 is moved rightward by chain 9 while rod 61 stands in its right hand position, no interference occurs and shaft 5 is shifted to produce a narrowing or widening effect in one of the courses inserted into the fabric due to the combined action of auxiliary pattern control mechanism 8 and course-counter mechanism 10.

On the other hand, when it is desired to cause a narrowing or widening effect when the course inserting means 10 is to remain idle, the most usual situation, a button is placed on chain 7 so as to act directly on lever 27 to cause it to turn clockwise on its pivot to cause shaft 45 to operate and cause a shogging action of shaft 5 suitable for a narrowing or widening operation. At this time levers 29, 57 and 58 remain stationary and the end of lever 27 moves away from the lever 29.

The auxiliary patterning means 8 is, as previously indicated, controlled from the main patterning means 6 through rod 26.

Normally, rod 26 is held in a rightward position as viewed in Figs. 1, 4 and 12 by said spring 26A, and a dog or lug 68 shown thereon in Fig. 12 is then held in position to press the lower end of a generally vertical lever 70 toward the right as viewed in Fig. 12. When rod 26 is operated by chain 7 of means 6, it moves to the left as viewed in Figs. 1, 4, 6 and 12. Rod 26 thereby tensions a spring 69 which is connected between a point on the rod to the left of the lever 70 and the lower end of said lever. Lever 70 is pivoted at 71 and has a dog or hook 72 at its upper end adapted to engage with teeth 73 on a wheel 74. The tensioning of spring 69 turns lever 70 clockwise to engage dog 72 with wheel 74, thereby preventing wheel 74 from moving. When wheel 74 is held stationary, a means for racking mechanism 8 is thrown into action. Said racking means comprises a cam 76 shown on the cam shaft 5 in Fig. 9 which acts in concert with a roller-type cam follower 77 to move a lever 78 in the counterclockwise direction as viewed in Fig. 9. Lever 78 extends forwardly from the vertical plane of shaft 5 and, on the side forward of its pivot 79 from the cam follower, it has an operating contact with a lever 80, best shown in Fig. 14, one end of which is pivoted on a shaft 81 on which said wheel 74 is also loosely mounted, shaft 81 being shown as extending at right angles to shaft 5 so that lever 80 extends at right angles to lever 78. A tension spring 83 is connected between the outer end of lever 80 and a fixed point, thereby biasing lever 80 in the clockwise direction as shown in Fig. 14 and maintaining follower 77 normally in contact with cam 76. Mounted to revolve on shaft 81 is a drum 84 at each end of which is a sprocket wheel 85 for driving auxiliary pattern chain 9, while a ratchet 86 which is fixed to drum 84 lies on the inside of the inner sprocket 85 for receiving impulses from a pawl 87 pivoted on lever 80 as indicated at 88. A spring 89 connects pawl 87 to the free and forward end of lever 78 and serves to hold pawl 87 in position to engage ratchet 86 unless prevented from so doing. In order that wheel 86 and therefore chain 9 will normally remain stationary when once stopped and so that operation of lever 70 by rod 26 to engage ratchet 74 may start means 8 into operation, wheel 74 has lugs 90 thereon shown in Figs. 10, 11, 14 and 15 which project laterally from the wheel 74. The outer surfaces of lugs 90 are approximately at the same radial distance from the axis of shaft 81 as the tops of the teeth of ratchet wheel 86 and project close to edge of wheel 86, while the pawl 87 is wide enough not only to engage the teeth of wheel 86 but to overlap onto lugs 90, as shown in Fig. 15. However, lugs 90 are spaced twice the distance of the teeth in wheel 86 and are so arranged that they can block the tooth of pawl 87 from entering every other tooth recess of wheel 86 as is shown in Figs. 10 and 14. Further, the lever 80 carries a spring pressed radial plunger 91 (shown in Fig. 11) which oscillates with the lever and is formed into a dog 92 at its radially inner end. Dog 92 is shaped the same as the tooth notches in wheel 74 and, owing to the spring pressure exerted on plunger 91, the dog normally causes wheel 74 to oscillate back and forth with racking lever 80. Lever 80, of course, moves pawl 87 an angular distance equal to the angular spacing of the tooth notches in wheels 74 and 86, the two wheels having the same number of tooth notches. However, wheel 74 can slip counterclockwise relative to the dog 92 when wheel 74 is prevented from turning in the clockwise direction, such slippage being permitted by the inclination of the tooth notches 73 and the similar inclination of the dog.

Therefore, assuming that the drum 84 and chain 9 are to be stationary for a certain period as at the beginning of knitting of a stocking blank, wheel 74 is set so that a lug 90 prevents the tooth of racking pawl 87 from falling into a tooth of wheel 86 while lever 78 is in the position shown in Figs. 9 and 14, that is when the pawl 87 is at the limit of its movement in the racking direction, the counterclockwise direction as viewed in Fig. 14. When now the levers 78 and 80 move in the opposite direction, the clockwise direction as viewed in Figs. 10 and 14, wheel 74 and lugs 90 move the same distance and at the same rate so that when the tooth of pawl 87 reaches the mouth of another notch in wheel 86, it is still prevented by the lug 90 from obtaining a racking engagement with wheel 86. Therefore, wheel 86 and the chain 9 will remain stationary so long as this condition continues.

When, however, a button on chain 7 has caused hook 72 of lever 70 to engage a tooth of wheel 74, it is held temporarily stationary so that dog 92 slides on wheel 74 in the clockwise direction, thereby being positioned to step wheel 74 the distance between two adjacent teeth in the counterclockwise direction relative to wheel 86 with the next racking movement of the lever 80. The racking tooth of pawl 87 thereupon drops into engagement with a tooth notch in wheel 86 so as to rack the wheel and chain 9 and this relationship continues until wheel 74 is again slipped a tooth relative to wheel 86.

Having once been started, chain 9 and wheel 86 continue to be racked until a button on chain 9 throws wheel 74 again into position to render racking pawl 87 ineffective. Means whereby this is accomplished comprises a lever 93 best shown perhaps in Fig. 10, pivoted on shaft 94, and having a dog 95 fixed thereon. Lever 93 is shown as extending downwardly below sprockets 85 so that a spring 96 connected between its lower end and a fixed point draws the lever clockwise as viewed in Fig. 10 and against a fixed stop 97 so that the dog 95 lies close to the surface of chain 9. Also pivoted on shaft 94 are two pawls 98 and 99 and which are adapted at times to cooperate with wheels 74 and 86 respectively. When lever 93 stands in the position shown in Fig. 10, the pawl 98 is held clear of the teeth of wheel 74 by a stop bolt 100, best shown perhaps in Fig. 11, which is set in an arm 101 fixed on lever 93 and offset laterally therefrom, bolt 100 contacting a tail portion 102 of pawl 98. At the same time, pawl 99 is held clear of the teeth of wheel 86 by a bolt 103 which contacts the upper edge of pawl 98 and is connected to pawl 99 by an arm 104 integral therewith. Therefore, lever 93 holds pawl 99 inoperative at the same time it holds pawl 98 inoperative. However, the tail 102 of pawl 98 is held against stop bolt 100 by a spring 105 shown in Fig. 11 so that a counterclockwise movement of lever 93 moves pawls 98 and 99 yieldingly against their respective wheels 74 and 86. Such a movement of lever 93 is produced by a button which is set on chain 9 at a point to cause it to contact dog 95 at a time it is desired to stop chain 9. Pawls 98 and 99 thereupon engage wheels 74 and 86 and cause the wheels to be held stationary at the time dog 92 makes a clockwise movement as viewed in Fig. 11 so that dog 92 engages a new tooth in wheel 74. Wheel 74 is thereby shifted one tooth relative to wheel 86 on the next racking movement of lever 80 and the lugs 90 are thereby again positioned so as to prevent pawl 87 from operatively engaging the teeth of wheel 86. Auxiliary patterning mechanism 8 thereupon remains stationary until a button on chain 7 again operates rod 26 and lever 70 to hold wheel 74 so as to slip dog 92 on the teeth of said wheel. The stopping of chain 9 by pawls 98 and 99 as just described, however, has no effect on the operation of the course-inserting means 10 for reasons which will hereinafter appear.

While only two control rods operated by chain 9 are important to the invention, it will be evident that almost any desired number of control rods may be operated by said chain, spaces for a considerable number of rods being indicated in Fig. 9. A rod 82 for causing the usual speed reduction during narrowings controlled from chain 9 is also shown in Fig. 9, it having been found desirable to control these operations from chain 9 as well as certain of the narrowing operations.

However, chain 9 having been started, as soon as counter mechanism is to be operated, one of two buttons (not shown) on chain 9 operates one of two levers 106 and 107 about their common pivot 94 to move the rod 61 by pushing against dogs 108 and 108A respectively, pivotally mounted at 119A on a bracket 119 fixed to rod 61. The levers 106 and 107 are adapted to contact dogs 108 and 108A, respectively at their lower ends as shown in Figs. 9, 12, 13 and 17. The dogs 108 and 108A are movable by means of handles 137 from a full line position to a dot-and-dash line position shown in Fig. 12, for reasons hereinafter set forth, and are held in either position by plate springs 135. As hereinabove described, rod 61 then moves the pivoted lever 57 counterclockwise as viewed in Figs. 4 and 6 to turn lever 51 so that it swings clockwise beneath pin 54 to hold lever 18 in a position to which it has been moved by the high point of cam 14. Spring 19 is thereby rendered unable to move lever 18 downwardly so that the lever 16 and follower 17 thereon will be held at the position shown in Fig. 2 and chain 7 is held stationary until lever 51 is moved out of contact with lever 18. This is done after a predetermined number of revolutions of the shaft 5 by a movement of rod 61 caused by the biasing spring 64 when rod 61 is released by course-counter 10 as will presently appear.

At the same time that chain 9, through rod 61, stops the main chain 7, it moves a latch means associated with the course-counter 10 to temporarily lock or latch the rod 61 and, at approximately the same time, it starts the course-counter 10 and sets thereby in operation a means in the course-counter device which will restart the main chain 7 at the desired point in the formation of a fabric. Further, the course-counter has means associated with the means through which it is started for stopping itself at the desired point to permit it to function properly the next time it is started. The means by which the auxilary chain 9 and course-counter cooperate to latch rod 61 will now be described.

As best shown in Fig. 16, rod 61 has thereon a coupler 109 which connects rod 61 with a rod 110 which extends from coupler 109 back toward the sprocket wheel for chain 9. On rod 110 are fixed two collars 111 which embrace the lower rounded end of the vertical arm 112 on a T-shaped lever 113. The other arm 114 of lever 113 is substantially horizontal. It will be clear from Fig. 16 that when rod 61 is moved to the right from its normal position by chain 9, the position in which course-counter 10 is inactive, to stop the main chain 7, rod 110 will also be moved to the right as viewed in said figure, thereby moving arm 114 of lever 113 counterclockwise to lift its outer or free end. One of two latch levers 115 and 116 pivotally mounted on an axis 117 can then latch lever 113 in such lifted or counterclockwise position. To permit lever 113 to be so latched, arm 114 of lever 113 is provided with a 90° horizontal off-set 118 at its outer or free end under which may pass an off-set end 115A or 116A of either of levers 115 or 116, respectively, to hold arm 114 and lever 113 in the position shown in Fig. 21. Only one of levers 115 and 116 is operated at a time as the sequence in which they operate is important for other reasons than latching lever 113. The sequence in which levers 115 and 116 are operated is determined by the sequence in which levers 106 and 107 are operated and this is determined by the setting of the buttons on chain 9. When lever 106 is operated, lever 115 is also operated while lever 116 is operated at the same time as lever 107.

In order that levers 106 and 107 may control the operation of levers 115 and 116, levers 106 and 107 are shown as extended above their pivot 94 and at their upper ends levers 106 and 107 are pivotally connected to links 120 and 121 respectively. At their ends removed from levers 106 and 107, links 120 and 121 are pivotally connected to levers 122 and 123 respectively which are pivoted on an axis 124 best shown in Figs. 20, 21 and 22. The lower ends of levers 122 and 123 are adapted to operate pins 125 and 126 respectively, as shown in Fig. 23, which are fixed in and project from plungers 127 and 128 respectively. Plungers 127 and 128 are mounted in inclined cylinders 129 and 130, respectively, fixed to the frame. The upper ends of cylinders 129 and 130 are closed by screw caps 131 and 132, respectively, and compression springs, one of which is shown at 129A, Figs. 20 and 21, between said caps and plungers 127 and 128 press the plungers toward the lower ends of their cylinders 129 and 130 to maintain pins 125 and 126 in contact with levers 122 and 123. Plungers 127 and 128 are formed at their lower ends into latch portions 133 and 134, respectively, Figs. 20 and 23, which normally engage portions 136 and 138 which project one from each of levers 115 and 116 so that levers 115 and 116 are normally held in the position shown in Figs. 16, 20 and 22. As appears in Fig. 18, levers 115 and 116 are both offset along the axis of shaft 117, the depending portions of levers 115 and 116 being approximately in the same vertical planes as their respective hubs 139 and 140 while projections or arms 136 and 138 for engaging latches 133 and 134 are in the same vertical planes as their respective hubs 141 and 142. Hubs 139 and 141 are rigidly connected by a rib 143, while hubs 140 and 142 are similarly connected by a rib 149 which lies behind the line of hubs, Fig. 22. Tension springs 144 and 145 (Fig. 18) are provided for levers 115 and 116 respectively which tend to move said levers in the counterclockwise direction as viewed in Figs. 16, 20, 21 and 22. Said springs are connected at one end to a rod 146 fixed at one end to the frame of the machine and extending parallel to the shaft 117 on which levers 115 and 116 are mounted. Springs 144 and 145 are connected at their other ends to arms 147 and 148 rigid with hubs 139 and 140 respectively so that the tension of the springs tends to turn levers 115 and 116 as stated. Therefore, when arm 114 of lever 113 is lifted, the latch end 115A or 116A of lever 115 or 116 will pass beneath horizontal portion 118 of lever 113 to latch lever 113 in its counterclockwise position to which it has been moved by rod 61 of the auxiliary chain 9. As links or rods 120 and 121 are moved by the upper ends of the same levers 106 and 107 that move the rod 61, one of levers 115 and 116 is always unlatched by its latching dog 133 or 134 on plungers 127 or 128 in time to latch lever 113 when operated by rod 61. Rod 61, however, having been moved to stop the main pattern chain 7 and then latched in the stopping position by the action of one of levers 115 or 116 on lever 113, lever 115 or 116 maintains the chain 7 inoperative until lever 113 is released by lever 115 or 116, as the case may be. In order that lever 115 or 116 may be moved to release lever 113 and thereby permit chain 7 to start into operation again, the course-counting means 10 is employed.

*Course counting mechanism*

The course-counter mechanism employed for this purpose comprises, as shown, a counting wheel 150 fixed on a revolvable shaft 152 which has racking means individual thereto. The racking means for shaft 152 is shown in part in Figs. 16, 17 and 19 and comprises a cam 154 fixed on main cam shaft 5 and which revolves in use in contact with a roller type cam follower 156. Follower 156 is shown as pivoted on one end of a lever 158, which is pivoted in turn near its center. The other end of said lever 158 has fixed thereon an adjustable tappet piece 160 shown as having a rounded contact surface normally in contact with the lower end of a downwardly projecting bolt 162 near one end of a lever 164 best shown in Fig. 24, lever 164 being journalled on shaft 152, Fig. 19. A spring 166 shown in Fig. 19 and connected to lever 164 at the end thereof near bolt 162 maintains a downward pull on the lever to hold bolt 162 against tappet 160 and to hold follower 156 in contact with cam 154. On the other side of shaft 152 from bolt 162 and spring 166, lever 164 has a recurved end 165 affording a mounting for both ends of a pivot pin 168 for a broad racking pawl 170 which has a pin 172 thereon connected to the lever 164 by a spring 174, Fig. 26, whereby the broad pawl 170 is drawn toward the surfaces of two ratchet wheels 176 and 178 with both of which pawl 170 is broad enough to contact. Wheel 178 is journalled on shaft 152 so as to revolve freely with respect thereto while wheel 176 is fixed to shaft 152. While pawl 170 is wide enough to cover the edge faces of both wheels 176 and 178, wheel 178 has a slightly greater diameter than wheel 176 so that, except at points at which wheel 178 may have relatively deep notches such as one shown at 179 in Fig. 24, the pawl 170 is prevented by wheel 178 from engaging the teeth of wheel 176. As best shown in Figs. 24 and 25, wheel 178 has a relatively deep notch 179 only every sixth tooth so that pawl 170 can engage wheel 176 to rack it only one-sixth of the movements of pawl 170 by which wheel 178 is racked or every sixth revolution of the cam 154. In this way, the number of revolutions during which the main chain 7 may be held stationary by the course-counting means 10 and therefore the number of courses which can be inserted in a fabric by its use is greatly extended. However, it is essential that the course-counting means shall stand stationary during the greater part of the knitting of each fabric and, in fact, unless it is definitely started by an external impulse, it should remain stationary throughout the knitting of a fabric. Therefore, a means is provided for stopping wheel 176 at a certain point and for starting it from said point only when desired.

The means for so controlling wheel 176 comprises a U-shaped lever 180 journalled on shaft 152 between wheels 176 and 178. Lever 180 has two arms 182 and 184, arm 184 being connected to wheel 176 by a tension spring 186 which normally draws lever 180 in the clockwise direction relative to wheel 176 while a pin 188 on wheel 176 is so placed as to contact a radial face of arm 182, the face on the side toward arm 184, to limit the motion of lever 180 relative to wheel 176 due to the pull of spring 186. Therefore, lever 180 normally occupies the position relative to wheel 176 shown in Fig. 24 and the lever and wheel rotate together whenever the wheel is racked. However, arm 182 of lever 180 is long enough to hold pawl 170 out of contact with the ratchet teeth of wheels 176 and 178 so long as the parts occupy the positions shown in Fig. 24 and so to maintain wheels 176 and 178 stationary. Also, whenever wheels 176 and 178 have once been started revolving, arm 182 will throw pawl 170 out of action and stop the wheels as soon as arm 182 again reaches the position shown in Fig. 24. For preventing the pressure of racking pawl 170 from turning wheels 176 and 178 in the wrong direction on what should be an idle stroke, there are provided idling pawls 226 and 228 pivotally mounted on shaft 117, the upstanding tail portions 227 and 229 of pawls 226 and 228 being connected by springs 232 and 233 to the rod 146 so as to normally engage the pawls with the teeth of wheels 176 and 178 to prevent rotation thereof except in the counterclockwise direction as viewed in Fig. 24.

Means are provided therefore to move lever 180 and its arm 182 out of the position relative to pawl 170 shown in Fig. 24 to initiate, when desired, a period of rotation of wheels 176 and 178. For this purpose, a lever 190 is shown journalled on shaft 152 between lever 164 and wheel 178, Fig. 19, and lever 190 has pivoted thereon a pusher member 192 of pawl-like appearance which serves at times to push against arm 184 of lever 180 but does not engage teeth as in the case of the usual pawl. To permit such a pushing action, member 192 has a tooth-like projection 194 which extends radially inward between wheels 176 and 178, Fig. 17, so that it is adapted to push against arm 184 when lever 190 is turned counterclockwise from the position shown in Fig. 24 to the position shown in Fig. 25. To maintain member 192 in the proper position with respect to wheels 176 and 178 and to the arm 184, the end of member 192 is wider than the space between wheels 176 and 178 as best appears in Fig. 17, thereby providing a shoulder 196, Fig. 24, which rides on the peripheral surface of wheel 176. The member 192 is held in engagement with wheel 176 by a spring 195, see Fig. 26. As clearly appears in Figs. 24 and 25, arm 184 does not extend beyond the boundary of wheel 176 so that pawl 170 is not hindered by arm 184 from engaging the notches in wheels 176 and 178 at any time arm 184 passes beneath the pawl 170. Further, arms 182 and 184 are bevelled as shown at 198 as viewed in Figs. 24 and 25 so that pawl 170 and member 192 may both ride up over arms 182 and 184 when necessary without danger of catching thereon. As shown, when wheels 176 and 178 are stationary, the active end 194 of member 192 is angularly spaced from the adjacent edge of arm 184.

The upper end of lever 113 is connected to lever 190 by a link 200 indicated in dotted lines in Fig. 25 and pivoted to both said levers so that when lever 113 is turned by rod 110, part 194 of pusher member 192 thrusts against arm 184 to turn lever 180 counterclockwise as viewed in Figs. 24 and 25 sufficiently to move the outer end of arm 182 out from under pawl 170 to permit the pawl to engage the teeth of wheels 176 and 178. Once pawl 170 has fallen below the outer end of arm 182 and on the side thereof on which it is shown in Figs. 24 and 25, arm 182 cannot interfere with the racking action of pawl 170 again until the wheels and lever 180 have made a complete revolution because the clockwise side of arm 182 is radial and the adjacent face of racking pawl 170 is nearly radial so that, even if lever 113 were unlatched quickly enough to permit spring 186 to throw arm 182 against the end of the racking pawl, arm 182 could not interfere with the racking action of pawl 170. The spring 186 pulls arm 182 back into engagement with pin 188 as soon as the arm 184 has moved a sufficient distance away from the projection 194 on member 192 and the parts are rotated in such position to the position of Fig. 24. Thereupon, the bevelled end 198 of arm 182 stops the wheel 176, and therefore shaft 152, in the angular position shown in Fig. 24. This may be called the starting or zero position of wheel 176. The U-shaped lever 180, of which arms 182 and 184 form major parts, being a part of course-counter 10, it will be seen that course-counter 10, like chain 9, stops itself.

In order that lever 113 may be released at the desired time or times in the revolution of wheel 176 to thereby release rod 61 and restart the main pattern chain 7, a releasing means is employed associated with wheel 150 which is shown as also carried on shaft 152 and fixed thereto so as to revolve counterclockwise as viewed in Fig. 20. Said releasing means should comprise at least two devices in order that a different number of courses may be inserted at different points of a given fabric, as in the leg and the foot of a stocking. As shown, two releasing devices are employed, both associated with wheel 150 and one cooperating with lever 115 and one with lever 116. Assuming that a cycle of operations of the course-counting means 10 has been initiated by chain 9 and that arm 114 of lever 113 is held by lever 115 as shown in Fig. 21, arm 114 is released by a tappet piece 204 which is fixed at one end of an arm 206 of a lever 208 which is journalled on shaft 152 but rotated along with wheel 150 by a latch pin 210 which lies parallel to shaft 152 and is carried by an arm 214 of lever 208 shown as extending oppositely from shaft 152 from arm 206. Pin 210 can be inserted in any one of a considerable number of holes 212 in the wheel 150. Holes 212 are shown as arranged in a circle set some distance radially inward from the periphery of wheel 150 and the arm 214 need not therefore extend out to the edge of wheel 150, the reason for which arrangement will presently appear. Tappet piece 204 is adapted to contact a cooperating tappet piece 216 which is fixed at the end of an upwardly inclined arm 217 of lever 115, tappet pieces 204 and 216 lying in the same plane parallel to the plane of rotation of wheel 150. Tappet pieces 204 and 216 have reversely bevelled end portions 202 and 218 respectively so arranged that as piece 204 is carried beneath piece 216 during the revolution of wheel 150, the two pieces wedge one against the other and lever 115 is moved clockwise on its pivot shaft 117 as viewed in Figs. 20 and 21 to release lever 115 from engagement with off-set portion 118, of arm 114, thereby permitting lever 113 to move clockwise from the position shown in Fig. 21 and permitting the rod 61 to move to the left as viewed in Figs. 6 and 16 under the influence of spring 64, which action swings lever 57 clockwise about its pivot. Spring 55 thereupon moves lever 51 counterclockwise about its pivot 52 from the position shown in Fig. 6 to the position shown in Fig. 4. Spring 19 is thereby permitted to draw racking levers 16 and 18 down, so that cam 14 can become effective to lift pawl 20 during the revolution of the cam and the racking of chain 7 is resumed.

Assuming now that another cycle of operations of the course-counting means 10 has been inaugurated and that arm 114 of lever 113 is held by lever 116 instead of by lever 115, the two levers being plainly interchangeable in this respect, then, at the desired time, lever 116 is actuated by a second device associated with wheel 150. For holding lever 113, lever 116 has a projection 116A similar to the projection 115A of lever 115, for latching arm 114, and an arm 219 having a tappet piece 220 thereon similar to tappet 216, Fig. 22. Tappet piece 220 is arranged to be operated by a tappet piece 205 (Fig. 22) fixed to one end of a lever 209 and pieces 205 and 220 have opposite corners bevelled at 221 and 222, respectively, so as to wipe together when piece 205 is revolved counterclockwise. Lever 209 is journalled on shaft 152 alongside wheel 150 on the side of the wheel opposite lever 208 and the other end of which lever 209 projects laterally into the plane of wheel 150. Said other end has mounted therein a spring pressed radial plunger 211 having a knurled nut 211A on its outer end and having its inner end formed to engage in any one of a set of notches 213 in the edge of wheel 150. Notches 213 are equally spaced and, by setting plunger 211 in a proper notch, lever 209 will not only be revolved by wheel 150 but its tappet piece 205 will contact tappet 220 at the desired time to release lever arm 114 and thereby to release lever 113 to again permit operation of the main pattern chain 7. Owing to the fact that arm 214 of lever 208 does not reach the edge of wheel 150, levers 208 and 209 may pass each other without interference and each can therefor be set at any desired angle with respect to wheel 150 so either lever can cause the insertion of courses without interference from the other.

The maximum number of courses which may be inserted by either lever of the specific apparatus shown is 210 and the minimum number 6. In Fig. 20, tappet piece 204 is shown as being adjusted, relative to the wheel 150, to the position in which a maximum number of courses will be inserted, the tappet piece 204 being rotated for this purpose one complete revolution of the wheel 150 from the position shown in a counterclockwise direction and back to the same position. To obtain the minimum number of courses the tappet piece is adjusted in counterclockwise direction relative to the wheel 150 to a position in which the tappet piece is to the right of the tappet piece 216 or in the last position before the tappets 204 and 216 engage each other. When the tappets are in engagement or overlapping relation, in which position the tappets are set when no courses are to be inserted, the lever 115 can not latch the lever 113 and rod 61 in position to prevent operation of the chain 7. However, in the arrangement shown with a button on the chain 7 set to start the chain 9 into operation and a button on the chain 9 set to start the course-counter 10, it is desirable when no courses are to be inserted, that the course-counter 10 does not function. To prevent the button on the chain 9 from functioning to start the course-counter, the dog 108 is moved from its full line position to the dot-and-dash line position so that said button while operating the lever 106 to unlatch lever 115, will not shift the rod 61 and lever 113 and the end 115A of the lever 115 will engage the end 118 of lever 113 as shown in Fig. 20 to maintain the lever 115 in position to again be latched by the plunger 127 when the button moves out from beneath the lever 106. Also, the tappet piece 205 may be adjusted relative to wheel 150 as hereinabove set forth and the lever 107 is in like manner prevented from setting into operation the course-counter by moving the dog 108A to the dot-and-dash line position. By this arrangement either lever 106 or 107 or both levers may be made inactive by moving the dogs 108 and 108A to inactive position as desired without changing or removing the buttons on chains 7 and 9 controlling the operation of the course-counter.

As previously indicated, the release of lever 115 or lever 116 and the consequent restarting of main chain 7 does not necessarily affect the racking of wheel 150 which stops only when arm 182 moves beneath the free end of racking pawl 170.

The method of operating the apparatus according to the invention will be evident to those skilled in the art from the foregoing description. For purposes of convenience, however, the method of operation of the apparatus will be recapitulated as follows:

The main pattern chain 7 having been set to make a stocking or other fabric of a certain number of courses and having such other features as it may be desirable and feasible for the machine to incorporate therein and, it then being desired to incorporate additional courses in the fabric in two or more places, buttons are placed on the chain 7 at proper places and chain 7 acts thru rod 25 to throw lever 70 against wheel 74, thereby throwing auxiliary pattern chain 9 into operation. Chain 9 thereupon acts thru rod 61 to stop chain 7 and also to throw the course-counting means 10 into operation. Thereafter, the chain 9 remains in operation until it stops itself by means of a button set to operate lever 93 counterclockwise on its pivot shaft 94. The counterclockwise movement of lever 93 causes a pawl 98 on pivot rod 94 to then engage wheel 74 to interrupt the racking movement of chain 9 by moving a lug 90 so as to prevent the racking pawl 87 for said chain from engaging a tooth on wheel 86. Any stopping button for chain 9, however, will be set to permit such chain to run long enough at a time to cause the cam shaft 5 to be shogged for any narrowing operation desired while the needed extra or additional courses are being inserted. Otherwise chain 9 need be racked only one tooth before stopping.

Chain 9 acts to start course-inserting means 10 into action by actuating either of levers 106 and 107, these levers being commonly used in alternation in the arrangement shown. Each of levers 106 and 107 not only operates rod 61 to stop chain 7 but it releases by rod 120 or rod 121 a latch lever, either lever 115 or lever 116 as the case may be, biased to latch lever 113 and rod 61 in position to maintain chain 7 stationary until the latch lever in action is actuated by a tappet on lever 208 or 209, as the case may be, to release rod 61. Further, each of levers 106 and 107, when actuated, positively initiates, through rod 61, lever 113 and link 200, an operation of course-counting means 10 by so moving a lever 180 which normally interferes with the racking pawl 170 for racking the course-inserting means that the said racking pawl 170 is free to act. After the course-inserting means 10 has once been started and wheel 176 has moved a short distance, pin 188 fixed on wheel 176 again moves into contact with lever arm 182 and the arm 182 is then again held by a spring 186 in position to interfere with said racking pawl 170 when the revolving portions of the course-inserting means have made a complete revolution. During such a revolution, however, one of the levers 208 and 209 which revolve with the counting wheel 150 acts by means of a tappet on lever 208 or 209, as the case may be, to unlatch the lever 113 and thus rod 61. As levers 208 and 209 can each be adjusted from any one desired angular position with respect to wheel 150 to any other within fairly close limits, the number of courses which can be inserted by the use of the arrangement shown can vary from six upwardly, in complements as determined by the deep notches 179, in this instance six courses, to 210 as determined by one complete revolution of wheel 150. By placing buttons on chain 9 alternately in one row and another, levers 106 and 107 are operated in alternation so that levers 208 and 209 are effective in alternation to release lever 113 to restart the main chain 7. As levers 208 and 209 can be set entirely independently of each other, a desired number of courses can be inserted in one place in a fabric by the use of the invention and a desired different number of courses can be inserted thereby at another point in the fabric. Therefore, the invention can be conveniently used to insert courses first in the leg and then in the foot of a stocking, it being generally desired to insert a different number of courses in the leg than in the foot. However, by suitably setting the buttons on chain 9, lever 106 can be operated either one, two or more times in the course of making a given fabric and lever 107 can be operated either one, two or more times in the same fabric if desired. Therefore, if it is desired to insert in one place more courses than can be knitted during one revolution of wheel 150, the lever 208 or 209 can be set to count one half the desired number of courses to be inserted at a certain point in the stocking blank and the same one of levers 106 and 107 operated twice in succession, the second time immediately after wheel 150 has counted the first half of the total number of courses which it is desired to insert at approximately a given point in a fabric. Thereby twice the number of courses for which the indexing lever was set will be inserted at a given point. The other indexing lever can then be used to control the insertion of courses at some other point. The latter indexing lever likewise may be set to cause the insertion of any number of courses up to the maximum permitted by the construction of the course-counter at any point determined by the setting of a button on the chain in direct control of the counter. Similarly, buttons may be provided on the chain controlling the latter indexing means to cause the course counter to repeat the insertion of the number of courses for which the latter indexing lever has been set as soon as the first group of courses under its control has been knitted and such a repetition can be repeated in turn as often as desired. Assuming then that the counting wheel or wheels associated with the indexing levers permit the indexing levers to be set for the insertion of not more than 210 courses at a time and it is desired to insert for example, 342 courses in the stocking blank, 240 courses in the leg and 102 courses in the foot, the buttons on chains 7 and 9 and the indexing levers 208 and 209 could be arranged in a number of different ways. For instance, the indexing lever 208 could be set so that it would cause the insertion of 138 courses and lever 209 could be set to cause the insertion of 102 courses. In this case, a button would be set on chain 7 in a certain aisle thereon to act in the leg section to stop chain 7 and to throw chain 9 into operation and a button would be set on chain 9 in a certain aisle thereon to throw the course-counting means 10 into operation with lever 208 in control to cause the insertion of 138 courses and a button would be set on chain 7 in said certain aisle thereof and one on chain 9 in another certain aisle thereof to act sometime after said 138 courses have been completed to throw the course-counter 10 into operation with lever 209 in control to cause the insertion of 102 courses. Other buttons would also be set on chain 9, in a different aisle on chain 9 from either of those used for starting counting means 10, so as to stop chain 9 immediately after the completion of any fashioning operations required in said 138 courses and said 102 courses. The two operations would therefore insert 138 plus 102 courses at one point in the leg of the stocking blank or other fabric. Also buttons would be set on chain 7 and chain 9, one in said certain aisle on chain 7 and one in said second mentioned aisle on chain 9 to act during the knitting of the foot to stop chain 7 and throw chain 9 and course-counter 10 into operation with lever 209 in control of the operation, thereby causing the insertion of 102 courses in the foot and completing the insertion of 344 courses in the stocking as a whole, a button also being used in said third or last mentioned aisle of chain 9 to stop chain 9 at the desired point after the production of the last group of 102 courses has been begun. However, the mechanism disclosed is quite flexible as to its method of operation and indexing lever 208 could be set for 120 courses and indexing lever 209 set for 102 courses with the buttons on the chains arranged to cause the 120 course operation to be repeated to insert 120 plus 120 courses in the leg and thereafter to cause the 102-course operation to be performed to insert 102 courses in the foot. In either case, the buttons and levers once having been set, the machine would require no attention on the part of the knitter to continue making blanks of the same general pattern as that for which the patterning means had first been set for 344 more courses.

Of course, the improvements specifically shown and described by which I obtain the referred to results, can be changed and modified in various ways without departing from the invention herein disclosed and hereinafter claimed. Further, it will be understood that where the word "plurality" occurs in the following claims, it is to be taken broadly as including two or more.

I claim as my invention:

1. The combination in a straight knitting machine having patterning means including a plurality of separably operable portions and means for racking said means, of a course-counter means for course-inserting having a normally stationary counting wheel, means for racking said wheel, means whereby a portion of said patterning means initiates operation of said racking means for said wheel, said course-counter also including a plurality of independent counting means associated with said wheel each operable to effect a different number of the courses counted thereby, and means operated by said patterning means adapted to control the selection and initiation of operation of one of said independent counting means.

2. In a course-counter means for a straight knitting machine, the combination of a counting wheel standing normally at a starting point, means for racking said wheel, a plurality of means associated with said wheel and shiftable with relation thereto and each adapted to be set at any desired relation to the wheel, means to initiate the rotation of said wheel, means whereby each of said shiftable means can deliver an impulse to another mechanism at a determinable but variable point in the rotation of said wheel, and means whereby the racking of said wheel is continued after the delivery of each said impulse until the wheel reaches said starting point.

3. In a straight knitting machine in combination, a pattern chain, a cam shaft, means to rack said chain including a cam on said shaft, an auxiliary pattern chain, means for racking said auxiliary chain, means operated by said first chain for initiating operation of said racking means for said auxiliary chain, means operated by said auxiliary chain to interrupt the movement of said racking means for said first chain, a counter wheel, means for racking said counter wheel normally ineffective to move the wheel, means whereby said auxiliary chain may start the racking of said wheel a plurality of times during a complete cycle of said first chain, means whereby said auxiliary chain may stop itself, means whereby said wheel may start said first chain after each stoppage thereof and a determinable variable number of courses after the first chain has been stopped, and means whereby the wheel stops itself.

4. In a course-counter mechanism for straight knitting machines, a wheel, means to rack said wheel, patterning means having a main chain and an auxiliary chain each having racking means, means whereby said auxiliary chain stops said main chain including a plurality of levers operated by said auxiliary chain and a rod common thereto, means associated with each of said levers for latching said rod in position to hold said main chain stationary, and means associated with said wheel for releasing said latching means at desired times to start the main chain.

5. In a course-counter mechanism for straight knitting machines, a wheel, means to rack said wheel, patterning means having a main chain and an auxiliary chain each having racking means, means whereby said auxiliary chain stops said main chain including a plurality of levers operated by the auxiliary chain and a rod common thereto, a lever connected to said rod, means to latch said last mentioned lever in position to hold the rod in position to hold the main chain stationary, and means associated with said wheel for releasing said latching means at desired times to start the main chain.

6. In a course-counter mechanism for straight knitting machines, a wheel, means to rack said wheel, patterning means having a main chain and an auxiliary chain each having racking means, means whereby said auxiliary chain stops said main chain including a plurality of levers operated by said auxiliary chain and a rod common thereto, a holding lever connected to said rod, means to latch said holding lever in position to hold the rod so as to maintain the main chain stationary including a set of levers one for each of said first levers and biased toward a position to latch said holding lever, latching means for said last mentioned levers adapted to hold them inoperative with relation to said holding lever, means operated by said first levers for individually releasing said latching levers for association with said holding lever, and means associated with said wheel for releasing said latching levers from said holding lever at desired times to start the main chain.

7. In a course-counter mechanism for straight knitting machines, in combination, a wheel, means to rack said wheel, patterning means having a main chain and an auxiliary chain each having racking means, means whereby said auxiliary chain stops said main chain including a rod and a holding lever connected to said rod, means controlled by said auxiliary chain to latch said holding lever in position to hold said rod so as to maintain the main chain stationary, a plurality of individually operable tappet members each adapted to release said holding lever from said latching means, and a plurality of tappet members mounted to rotate with said wheel and individually adjustable relative thereto for actuating said first mentioned tappet members as desired.

8. In a course-counter mechanism for knitting machines, in combination, a wheel, means for racking said wheel, patterning means having a main chain and an auxiliary chain each having racking means, means whereby said auxiliary chain stops the racking means for said main chain including a rod and a holding lever connected to said rod, means controlled by said auxiliary chain to latch said holding lever in position to hold said rod so as to maintain the main chain stationary, and a plurality of tappet members mounted to rotate with said wheel and individually adapted to release said latching means to permit said rod to start said racking means for said main chain.

9. The combination in a straight knitting machine comprising main pattern means, racking means therefor, an auxiliary pattern means, a course-counter means, a cam shaft, means for shifting said shaft controlled by said auxiliary pattern means, means also controlled by said auxiliary pattern means acting simultaneously with said shaft shifting means for preventing operation of said racking means, and means controlled by said auxiliary pattern means for initiating operation of said course-counter means.

10. The combination in a straight knitting machine comprising main pattern means, racking means therefor, an auxiliary pattern means, a course-counter means, a cam shaft, means for shifting said shaft controlled by said auxiliary pattern means, means also controlled by said auxiliary pattern means acting simultaneously with said shaft shifting means for preventing operation of said racking means, and means actuated by said course-counter means for starting said racking means.

11. In a straight knitting machine, a pattern chain, a control rod biased in one direction and operated at times by said chain in the opposite direction, a lever engaged with said rod so as to be moved about its pivot by movements of said rod, said lever having a portion off-set generally at right angles to the plane of oscillation of the lever, a second lever having an off-set portion in a plane generally at right angles to the off-set portion of said first lever and arranged to engage it to latch said rod after movement by said chain and course-counter means started into motion by said chain to release said levers from latching engagement and thereafter interrupting its own motion.

12. In a course-counter means for course-inserting for straight knitting machines, the combination of a counting wheel, a reciprocating pawl for racking said wheel at desired times, means holding said pawl normally ineffective, a control rod biased in one direction and moved at times in the opposite direction, a lever engaged with said rod to turn in response to movements of the rod, a connection between said lever and said holding means for moving the holding means so that said pawl is effective, means for latching said lever in the position in which said holding means is ineffective and said pawl effective to rack the wheel, and means operated by said wheel to unlatch said lever and thereby enable said control rod to move to its biased position, said holding means adapted to move said pawl to ineffective position upon further racking of said pawl.

13. In a course-counter means for course-inserting for straight knitting machines, the combination of a counting wheel, a reciprocating pawl for racking said wheel at desired times, means holding said pawl normally ineffective, a control rod biased in one direction and moved at times in the opposite direction, a lever engaged with said rod to turn in response to movements of the rod, a connection between said lever and said holding means for moving the holding means so that said pawl is effective, means including two latch levers for latching said lever in a position in which said holding means is ineffective, two members adjustable relatively to and moving with said wheel each adapted in cooperation with one of said latch levers to unlatch said wheel to unlatch said lever and thereby ensaid lever and thereby enable said control rod to move to its biased position and pattern means controlling said latch levers to determine which of said two members will be effective at a given time to unlatch said lever.

14. In a course-counter means for course-inserting in combination, a shaft, a counting wheel mounted on said shaft, a pair of tappet levers arranged one on each side of said wheel and journalled on said shaft, means for securing said levers to said wheel in various desired angular positions relative thereto, tappet members on said levers, a second shaft, a pair of latch levers mounted on said shaft, a second pair of tappet members connected to turn with said latch levers and arranged to occupy a position in which the latch levers are not affected by said first tappet members and one in which they are so affected, means biasing said levers and second tappet members to the positions in which they are affected by said first tappet members, releasable means for holding said second tappet members against the action of said biasing means, and means including portions individual to each of said second tappet members for causing said holding means to release the second tappet members one at a time.

15. In a course-counter device, the combination with a counter wheel of a pair of levers having tappet members thereon and mounted on opposite sides of the wheel to revolve on the same axis as the wheel but engageable therewith at individually adjusted positions.

16. The method of operating a straight knitting machine having a main pattern chain, an auxiliary pattern chain and course-counter means comprising moving said main chain intermittently during certain knitting periods, maintaining said auxiliary chain and said course-counter means stationary during most of the time said main chain is subject to be moved, controlling the starting of said auxiliary chain from said main chain, controlling the stopping of said main chain and the starting of said course-counter from said auxiliary chain, continuing to knit substantially the entire time said main chain is inactive, controlling the stopping of said auxiliary chain by itself, controlling the restarting of said main chain by said course-counter, and controlling the stopping of the course-counter by itself.

17. The method of operating a straight knitting machine having a main pattern chain, an auxiliary pattern chain, course-counter means, racking means for each of said means, a cam shaft and a means for shogging said shaft comprising racking said main chain intermittently during certain knitting periods; maintaining said auxiliary chain and said course-counter means inactive during most of the time said main chain is subject to be racked; controlling the operation of said shogging means, the interrupting of the racking of said main chain and the beginning of racking of said course-counter means from said auxiliary chain; continuing to knit substantially the entire time said main chain is inactive; controlling the interrupting of the racking of said auxiliary chain by itself; controlling the restarting of racking of said main chain by said course-counter; and controlling the stopping of the course-counter by itself.

18. In a method of operating a straight knitting machine having a chain and course-counter means including two latching members for preventing movements of said chain together with a member for releasing each of said latching members, the steps comprising moving said latching members alternately from a non-latching to a latching position and releasing any latching member which may be in latching position before moving the other latching member to latching position.

19. In a method of operating a straight knitting machine having a chain and course-counter means including two latching members for preventing movements of said chain together with a counting-wheel having two releasing members for said latching members rotatable with said wheel and engageable therewith each at substantially any desired angular position relative thereto, the steps comprising setting said releasing members at different angular positions relative to said wheel, moving said latching members alternately from non-latching to latching position, setting said releasing members so that the first latching member to be moved to latching position is the first to be released, and rotating said wheel to release said latching members alternately.

20. In a straight knitting machine, the combination of a pattern control mechanism including separately operable main and auxiilary portions, a course-counter mechanism put into operation by said auxiliary portion and adapted to be set to maintain an interruption of the operation of said main portion of the pattern control mechanism a plurality of times and for different periods during one cycle of operations of the pattern control mechanism, and to repeat the plural interruptions of the patterning operation in the knitting in any desired number of consecutive subsequent complete cycles of said pattern control mechanism.

21. The combination in a straight knitting machine of a pattern control means selectively operable at each revolution of the machine in which a course is knitted and including main and auxiliary portions, a course-counter mechanism, actuating means therefor, means operated by said auxiliary portion more than once in a single cycle of the pattern control means for initiating operation of said actuating means, means forming a part of said counter mechanism for stopping said main portion of the pattern control means when said mechanism is started and adapted to maintain the pattern control means stopped for different intervals in a cycle of the control means.

22. The combination in a straight knitting machine of a pattern control means selectively operable at each revolution of the machine in which a course is knitted and including main and auxiliary portions, a course-counter mechanism, actuating means therefor, and means operated by said main portion of the pattern control means more than once in a single cycle of the pattern control means for initiating operation of said actuating means through said auxiliary portion of the pattern control means, said course-counter mechanism being capable of regulation so as to produce in the count the same or a different number of courses during each actuation thereof.

23. The combination in a straight knitting machine of a pattern control means selectively operable at each revolution of the machine in which a course is knitted and including main and auxiliary portions, a course-counter mechanism, means for actuating said main portion, means for actuating said auxiliary portion, means for actuating said counter mechanism, means operated by said main portion of the pattern control means more than once in a single cycle of the pattern control means for initiating operation of the auxiliary portion thereof by its actuating means, means operated by said auxiliary portion also more than once during a single cycle of the pattern control means for initiating operation of said counter mechanism by its actuating means, said counter mechanism being capable of regulation so as to produce in the count the same or a different number of courses during each actuation thereof, and means operated by said course-counter mechanism for initiating operation of said main portion of the pattern control means by its actuating means.

24. The combination in a straight knitting machine of a pattern control means including separately and intermittently operating main and auxiliary portions, an intermittently operating course-counter mechanism capable of regulation so as to provide for the same or a different number of courses during each actuation thereof, actuating means for said portions and said mechanism, means whereby said main portion renders active the actuating means for said auxiliary portion and said mechanism, said auxiliary portion and said mechnism acting jointly to stop said main porton and to prevent it from operating for a time corresponding to the regulation of the mechanism and then starting the main portion of the control means, and means exclusive of said main portion for throwing out of operation the actuating means of said mechanism and said auxiliary portion until started again by said main portion.

25. The combination in a straight knitting machine comprising main pattern means, actuating means therefor, an auxiliary pattern means, a course-counter means, a cam shaft having means for energising said actuating means, means controlled by said auxiliary pattern means for preventing operation of said actuating means, and means actuated by said course-counter means for releasing said preventing means.

26. In a knitting machine, a combined pattern control and course-counter mechanism comprising a pattern control means operating through a complete cycle for each complete fabric and normally advanced in a given direction a number of times in the cycle proportional to its size, course-counting means including a member moving about an axis always in the same direction and starting always from a given angular position, and a plurality of members associated with said member, each of said plurality of members always connected to move with said first member and adjustable on said first member to various positions along its length, said pattern control means delivering at least twice in its cycle an impulse to start said first member from said position and at the same time stopping a main portion of itself, and which remains stopped for periods in a given cycle depending on the individual distances of said plurality of members from said starting position, each of said plurality of members adapted and arranged to individually, exclusively, and one after the other cause the course-counting means to deliver a starting impulse to the pattern control means to terminate one of said periods, the course-counting means adapted and arranged to continue said first member in operation after delivering each impulse to the pattern control means but only until the member arrives at the angular position from which it started.

27. In a straight knitting machine, the combination of a pattern control mechanism including separately operable main and auxiliary portions, a course-counter mechanism including a wheel put into operation by said auxiliary portion and adapted to be set to maintain an interruption of the operation of said main portion of the pattern control mechanism a plurality of times and for different periods during one cycle of operations of the pattern control mechanism, racking means for said main and auxiliary portions of the pattern control mechanism, means whereby said auxiliary portion stops said main portion including a plurality of levers operated by said auxiliary portion, and a rod common thereto, means associated with each of said levers for latching said rod in position to hold said main portion stationary, and means associated with said wheel for releasing said latching means at desired times to start the main portion.

28. In a straight knitting machine, the combination of a pattern control mechanism including separately operable main and auxiliary portions, a course-counter mechanism including a wheel put into operation by said auxiliary portion, and a pair of levers having tappet members thereon and mounted on opposite sides of the wheel to revolve on the same axis as the wheel but engageable therewith at individually adjusted positions to maintain an interruption of the operation of said main portion a plurality of times and for different periods during one cycle of operations of the pattern control mechanism, and to repeat the plural interruptions of the patterning operation in the knitting in any desired number of consecutive subsequent complete cycles of said pattern control mechanism, and means put into operation by said auxiliary portion to start said wheel.

29. In a straight knitting machine, the combination of a pattern control mechanism including separably operable main and auxiliary portions, a course-counter means put into operation by said auxiliary portion and adapted to be set to maintain an interruption of the operation of said main portion of the pattern control mechanism, a plurality of times and for different periods during one cycle of operations of the pattern control means, and to repeat the plural interruptions of the patterning operation in the knitting in any desired number of consecutive subsequent complete cycles of said pattern control means, fashioning means, and means including connections between said auxiliary portion and said fashioning means for controlling the operation of the fashioning means.

HERBERT ERICH HAEHNEL.

REFERENCES CITED

The following references are of record in the file of this patent:

UNITED STATES PATENTS

| Number | Name | Date |
|---|---|---|
| 1,593,842 | Morrell | July 27, 1926 |
| 2,077,778 | Start | Apr. 20, 1937 |
| 2,169,979 | Richter et al. | Aug. 15, 1939 |
| 2,214,936 | Pingel | Sept. 17, 1940 |
| 2,324,221 | Luhn | July 13, 1943 |
| 2,439,990 | Ryan | Apr. 20, 1948 |

Certificate of Correction

July 25, 1950

Patent No. 2,516,514

HERBERT ERICH HAEHNEL

It is hereby certified that error appears in the printed specification of the above numbered patent requiring correction as follows:

Column 22, line 71, for "rackinng" read *racking*; column 24, line 3, strike out "said wheel to unlatch said lever and thereby en-"; column 26, line 28, for "mechnism" read *mechanism*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*